(12) United States Patent
Tangudu et al.

(10) Patent No.: US 11,363,463 B2
(45) Date of Patent: Jun. 14, 2022

(54) METHODS AND SYSTEMS FOR MITIGATING DENIAL OF SERVICE (DOS) ATTACK IN A WIRELESS NETWORK

(71) Applicant: Samsung Electronics Co., Ltd., Suwon-si (KR)

(72) Inventors: Narendranath Durga Tangudu, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/803,828

(22) Filed: Feb. 27, 2020

(65) Prior Publication Data

US 2020/0275279 A1    Aug. 27, 2020

(30) Foreign Application Priority Data

Feb. 27, 2019 (IN) .............................. 201941007734
Feb. 25, 2020 (IN) .............................. 201941007734

(51) Int. Cl.
*H04W 12/122*       (2021.01)
*H04L 9/40*         (2022.01)
(Continued)

(52) U.S. Cl.
CPC ....... *H04W 12/122* (2021.01); *H04L 63/1458* (2013.01); *H04W 8/06* (2013.01);
(Continued)

(58) Field of Classification Search
CPC ... H04W 12/122; H04W 12/068; H04W 8/06; H04W 12/08; H04W 84/042;
(Continued)

(56) References Cited

U.S. PATENT DOCUMENTS

2011/0165878 A1* 7/2011 Nylander ............. H04J 11/0069
                                                       455/436
2011/0207428 A1* 8/2011 Ueda .................... H04W 12/126
                                                       455/404.1
(Continued)

FOREIGN PATENT DOCUMENTS

EP          0939571 A1      9/1999

OTHER PUBLICATIONS

3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), Dec. 2019, 417 pages.

(Continued)

*Primary Examiner* — Kenneth W Chang

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Methods, network entities, and systems for mitigating Denial of Service (DoS) attack in a wireless network (e.g., access network (AN), core network (CN)). Embodiments herein disclose methods and systems for mitigating Denial of Service (DOS) attacks in wireless networks, by performing admission control by verifying a User Equipment's (UE's) registration request via a Closed Access Group (CAG) cell without performing a primary authentication. Embodiments herein disclose methods and system for verifying permissions of the UE to access a CAG cell based on the UE's Subscription identifier, before performing the primary authentication. Methods and systems for mitigating Denial of Service (DoS) attack in a wireless network. A method for mitigating Denial of Service (DOS) attacks in wireless networks includes requesting a public land mobile network (PLMN) for accessing a non-public network (NPN) through (Continued)

a Closed Access Group (CAG) cell, verifying the permissions of a user equipment (UE) to access the requested NPN through the CAG cell, and performing a primary authentication.

18 Claims, 17 Drawing Sheets

(51) Int. Cl.
  *H04W 8/06*   (2009.01)
  *H04W 12/08*   (2021.01)
  *H04W 12/06*   (2021.01)
  *H04B 7/0413*   (2017.01)
  *H04W 84/04*   (2009.01)

(52) U.S. Cl.
  CPC ......... *H04W 12/068* (2021.01); *H04W 12/08* (2013.01); *H04B 7/0413* (2013.01); *H04L 2463/141* (2013.01); *H04W 84/042* (2013.01)

(58) Field of Classification Search
  CPC ............... H04W 12/06; H04L 63/1458; H04L 2463/141; H04B 7/0413
  See application file for complete search history.

(56) References Cited

U.S. PATENT DOCUMENTS

| | | | |
|---|---|---|---|
| 2012/0064889 A1* | 3/2012 | Tiwari | H04W 8/186 455/434 |
| 2018/0227871 A1 | 8/2018 | Singh et al. | |
| 2018/0324577 A1* | 11/2018 | Faccin | H04W 48/18 |
| 2018/0376445 A1* | 12/2018 | Yoon | H04W 76/30 |
| 2019/0174314 A1* | 6/2019 | Joseph | H04W 12/065 |

OTHER PUBLICATIONS

3GPP TS 33.501 V16.1.0 (Dec. 2019), Technical Specification, 3rd Generation Partnership Project; Technical Specification Group Services and System Aspects; Security architecture and procedures for 5G system (Release 16), Dec. 2019, 202 pages.

International Search Report and Written Opinion of the International Searching Authority in connection with International Application No. PCT/KR2020-002848 dated Jun. 18, 2020, 11 pages.

European Search Report in connection with European Application No. 20159868.7 dated Jul. 1, 2020, 9 pages.

3GPP TR 23.734 V0.4.0 (Dec. 2018), Technical Report, 3rd Generation Partnership Project; Technical Specification Group Services and System Aspects; Study on 5GS Enhanced support of Vertical and LAN Services (Release 16), 107 pages.

3GPP TR 23.734 V16.0.0 (Dec. 2018), Technical Report, 3rd Generation Partnership Project; Technical Specification Group Services and System Aspects; Study on enhancement of 5GS for Vertical and LAN Services (Release 16), Dec. 2018, 107 pages.

3GPP TS 23.502 V15.4.1 (Jan. 2019), Technical Specification, 3rd Generation Partnership Project; Technical Specification Group Services and System Aspects; Procedures for the 5G System; Stage 2 (Release 15), Jan. 2019, 347 pages.

3GPP TS 33.501 V15.3.1 (Dec. 2018), Technical Specification, 3rd Generation Partnership Project; Technical Specification Group Services and System Aspects; Security architecture and procedures for 5G system (Release 15), Dec. 2018, 182 pages.

Ericsson, et al. "TS 23.502: Introducing Non-public network—GAG," S2-1901575, 3GPP TSG-SA WG2 Meeting #131, Tenerife, Spain, Feb. 25-Mar. 1, 2019, 25 pages.

Communication pursuant to Article 94(3) EPC dated Sep. 8, 2021 in connection with European Patent Application No. 20 159 868.7, 5 pages.

* cited by examiner

METHODS AND SYSTEMS FOR MITIGATING DENIAL OF SERVICE (DOS) ATTACK IN A WIRELESS NETWORK

CROSS REFERENCE TO RELATED APPLICATION

This application is based on and derives the benefit of Indian Provisional Application 201941007734 as filed on Feb. 27, 2019 and Indian Complete Specification 201941007734, filed on Feb. 25, 2020, the contents of which are incorporated herein by reference.

BACKGROUND

1. Field

The present disclosure relates to the field of wireless networks and more particularly to mitigating Denial of Service (DoS) attacks in wireless networks.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Currently, private wireless networks/non-public networks (NPNs) are deployed by enterprises to meet and optimize coverage, performance, and security requirements of their business processes. The NPNs may be deployed as non-stand-alone NPNs and stand-alone NPNs. The non-stand-alone NPNs are deployed in conjunction with Public Land Mobile Networks (PLMNs) using Closed Access Group (CAG) cell and/or network slicing, also termed as Public Network integrated Non-Public Network. When the non-stand-alone NPNs are deployed with the PLMNs, User Equipments (UEs) may access the NPNs and obtain services provided by the NPNs via the PLMNs using the CAG cells. The CAG identifies a group of subscribers/UEs, who are permitted to access one or more CAG cells/NPNs. The CAG may also prevent the UEs from automatically selecting and registering from a location, which does not provide access to the NPNs, or from a location, which the UEs are not allowed to access the NPNs. The CAG is identified by a CAG identifier (CAG ID), which is broadcasted by the CAG cells/NPNs. The CAG cell broadcasts one or multiple CAG Identifiers per PLMN. The UEs may have NPN permissions/subscriptions/authorization to access the NPNs via the PLMN. The UEs may be further configured with an allowed list of CAG IDs/CAG cells (hereinafter referred as permissions to access the CAG cells/NPNs) based on its NPN permissions/subscriptions/authorization. When the UEs want to access the CAG cells/NPNs, the PLMN has to verify whether the UEs are allowed to access the CAG cells based on the NPN permissions/subscriptions of the UEs and the allowed list of CAG cells for the UEs. Embodiments herein use the terms such as "permissions", "subscription", "authorization" and so on interchangeably.

The stand-alone NPNs may be deployed without requiring the support of the PLMNs. The stand-alone NPNs may use the CAG and/or a non-public network identifier to identify a group of subscribers/UEs, who are permitted/authorized to access the one or more CAG cells/NPNs.

As per current 3GPP specification (TS 23.501), in order to access the NPNs, the UE initiates a registration procedure by sending a subscription concealed identifier (SUCI) in an initial Non Access Stratum (NAS) message (for example; a registration message) or in any NAS message (for example; an identity response message) to a serving network of the PLMN. The serving network performs a primary authentication procedure to authenticate the UE based on the received SUCI (after deconcealing the SUCI and deriving the SUPI) of the UE. Once the primary authentication is successful, the serving network verifies if the UE has permissions or if the UE is authorized to access the CAG cells/NPN and enables the UE to access the CAG cells/NPNs based on a successful verification. However, the serving network has to wait until completion of the successful primary authentication procedure to verify, if the UE has the permissions to access the CAG cells/NPN cells, which may result in an overhead on the serving network.

Further, when there are a large number of UEs in the network, the registration procedures performed by rogue/malfunctioning/malicious UEs to access the NPNs in the particular CAG cell or distributed at different CAG cells with/without having the valid NPN permissions and without having access to the CAG cells lead to (Distributed) Denial of Service ((D)DoS) attacks on the serving network.

The (D)DOS attacks may be possible when the UE performs the registration procedure with the valid NPN permissions and no permissions to the CAG cells or when the UE performs the registration procedure with no valid NPN permissions and no permissions to access the CAG cells.

Consider an example scenario, wherein the UE may be connected to a New Radio (NR/5G) network of the PLMN and the UE has the valid NPN permissions and does not have the permissions to access the CAG cells. The 5G network includes a NG-Radio Access Network (RAN), and a 5G core (5GC) network/serving network. The 5GC includes elements such as, but not limited to, an Access and Mobility Management Function (AMF), a Unified Data Management (UDM), an Authentication Server Function (AUSF), and so on.

In such a scenario, the UE initiates the registration procedure for accessing/obtaining the services provided by the CAG cell/NPN. The UE initiates the registration procedure by sending the SUCI as its identity to the NG-RAN requesting the access to the CAG cell/NPN. The NG-RAN forwards the received SUCI along with the CAG ID of the requested CAG cell/NPN to the AMF. The AMF inserts the CAG ID in the SUCI and forwards the SUCI of the UE along with the CAG ID to the UDM. The UDM reveals the received SUCI and generates an authentication vector. Based on the generated authentication vector by the UDM, the AMF authenticates the UE. In an example herein, consider that the primary authentication procedure is successful, since the UE has the valid NPN permissions. Once the primary authentication procedure is successful, the AMF receives a subscription permanent identifier (SUPI) of the UE from the AUSF and verifies if the UE has the permissions to access the requested CAG cell/NPN based on the received SUPI. In an example herein, the AMF verifies that the UE is not authorized to access the CAG cells, since the UE does not have the permissions. Thereafter, the AMF rejects the registration procedure initiated by the UE.

Consider another example scenario, wherein the UE is a rogue UE with no valid NPN permissions and no permissions to access the CAG cell/NPN. In such a scenario, the rogue UE sniffs the serving network and captures the SUCI (may or may not have the permissions to the CAG cell). The rogue UE then initiates the registration procedure by sending the captured SUCI as its identity to the AMF through the NG-RAN, wherein the NG-RAN may add the CAG ID of the requested CAG cell/NPN to the SUCI. The AMF forwards the received SUCI along with the CAG ID to the UDM, wherein the UDM reveals the SUCI, and generates the authentication vector. Based on the generated authentication vector, the AMF performs the authentication procedure. In an example herein, the AMF rejects the registration procedure of the UE, since the authentication fails, as the rogue UE does not have the valid NPN permissions.

Thus, in both the scenarios, irrespective of whether the UE possesses the valid NPN permissions or not, the serving network has to perform the primary authentication procedure to authorize the CAG cell access of the UE. Such procedures may lead to the overhead and the (D)DOS attacks on the serving network.

OBJECTS

The principal object of the embodiments herein is to disclose methods and systems for mitigating (Distributed) Denial of Service ((D)DOS) attacks in a wireless network, wherein the wireless network includes at least one non-public network (NPN) coupled with a Public Land Mobile Network (PLMN).

Another object of the embodiments herein is to disclose methods and systems for mitigating the (D)DoS attacks by verifying permissions of at least one User Equipment (UE) to access the at least one NPN before performing a primary authentication of the at least one UE.

Another object of the embodiments herein is to disclose methods and systems for verifying the permissions of the at least one User Equipment (UE) to access the at least one NPN using a subscription permanent identifier (SUPI) of the at least one UE and a Closed Access Group (CAG) Identifier (ID) of the requested at least one NPN.

SUMMARY

Accordingly, the embodiments herein provide methods and systems for controlling permissions of at least one User Equipment (UE) to access at least one Non-Public Network (NPN) in a wireless network. A method disclosed herein includes requesting, by the at least one UE, a Public Land Mobile Network (PLMN) for accessing the at least one NPN through at least one Closed Access Group (CAG) cell. The method further includes verifying, by a Core Network (CN) of the PLMN, the permissions of the at least one UE for accessing the requested at least one NPN through the at least one CAG cell. The method further includes performing, by the CN, a primary authentication procedure to allow the at least one UE for accessing the at least one NPN through the at least one CAG cell, if the permissions of the at least one UE for accessing the requested at least one NPN through the at least one CAG cell are verified.

Accordingly, the embodiments herein disclose a network comprising at least one User Equipment, at least one Non-Public network (NPN), and a Public Land Mobile Network (PLMN), deployed in conjunction with the at least one NPN. The PLMN includes at least one cellular network comprising of a Radio Access Network and a Core Network (CN). The at least one UE is configured to request the PLMN for accessing the at least one NPN through at least one Closed Access Group (CAG) cell. The CN of the PLMN is configured to verify permissions of the at least one UE for accessing the requested at least one NPN via the at least one CAG cell. The CN is further configured to perform a primary authentication procedure to allow the at least one UE for accessing the at least one NPN through the at least one CAG cell, if the permissions of the at least one UE for accessing the requested at least one NPN through the at least one CAG cell are verified.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
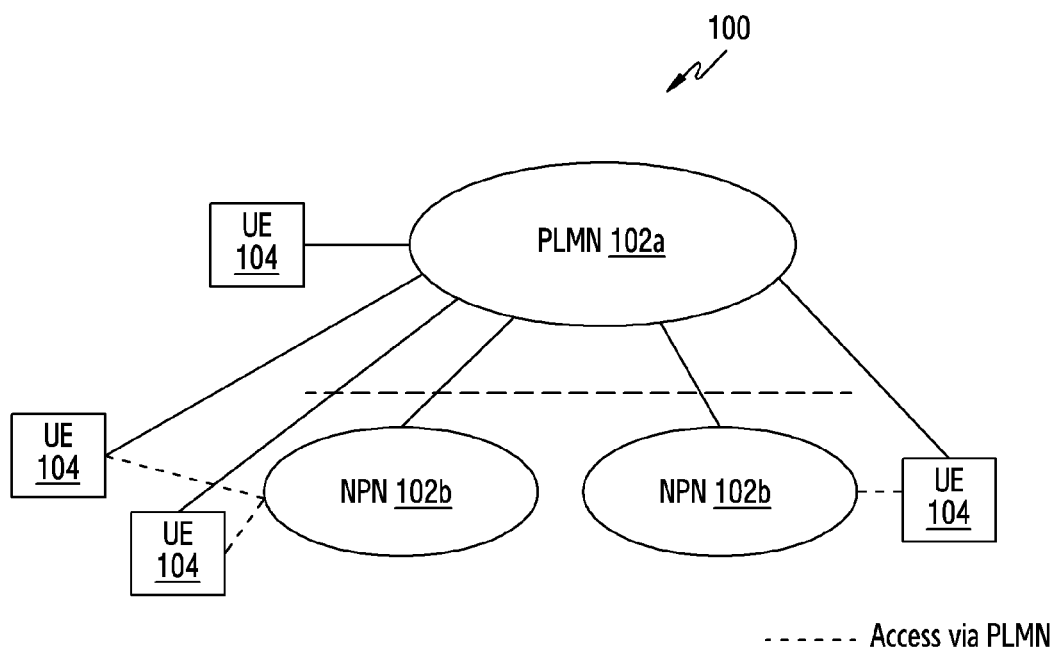
FIGS. 1A-1C depict a wireless communication system/wireless network, according to embodiments as disclosed herein.

FIGS. 1A through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for mitigating (Distributed) Denial of Service ((D)DOS) attacks in a wireless network, wherein the wireless network system includes at least one non-public network (NPN) coupled with a Public Land Mobile Network (PLMN).

Embodiments herein disclose methods and systems for mitigating the (D)DoS attacks by performing admission control by verifying permissions of at least one User Equipment (UE) to access the at least one NPN through a Closed Access Group (CAG) cell before performing a primary authentication of the at least one UE. The term "admission control for NPN" means verifying whether there are permissions or whether there is authorization for the UE to access the CAG cell. In an embodiment, if the UE has the permissions or subscription or authorization for accessing the NPN, then the corresponding CAG IDs of the NPN are listed in the UE's allowed CAG list. An Allowed CAG list is a list of CAG Identifiers the UE is allowed to access the CAG cell.

Referring now to the drawings, and more particularly to FIGS. 1A through 15, where similar reference characters denote corresponding features consistently throughout the figures, there are shown example embodiments.

Figure 1B:
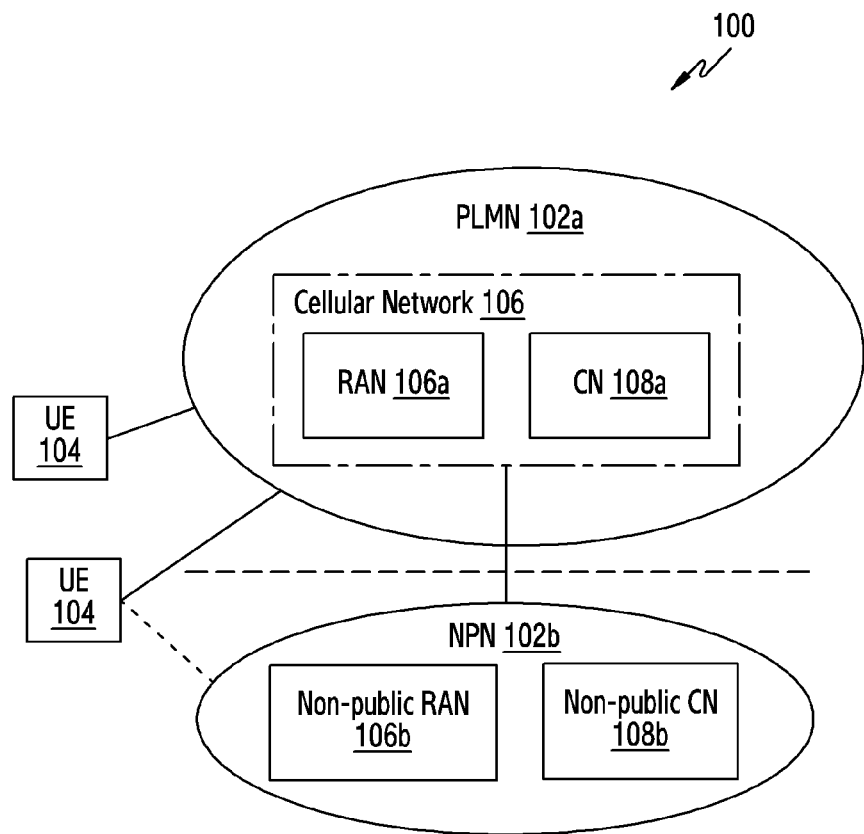
Figure 1C:
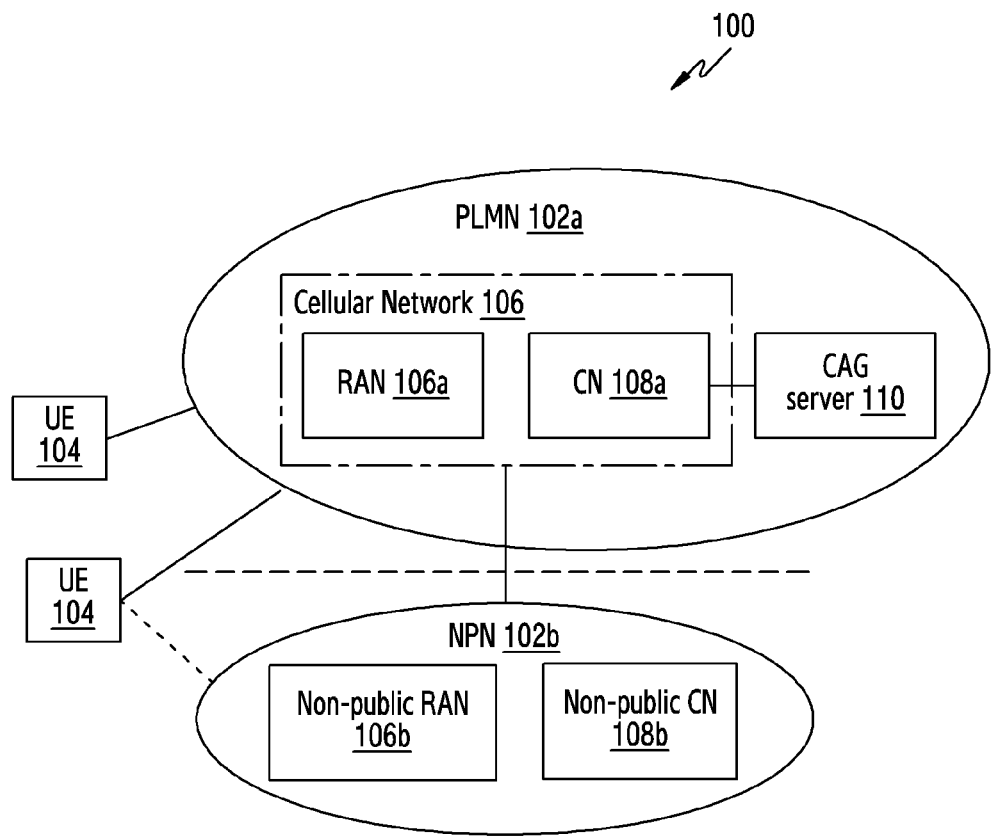

FIGS. 1A-1C depict a wireless communication system/wireless network 100, according to embodiments as disclosed herein. The wireless network 100 referred herein can be configured to mitigate a (Distributed) Denial of Service (D)DoS attack on a public network integrated non-public networks, which is resulting from a large number of registration requests from users/UEs who are not allowed to access the non-public networks.

The wireless network 100 includes a Public Land Mobile Network (PLMN) 102a, one or more non-public networks (NPNs) 102b, and a plurality of UEs 104.

The PLMN 102a includes one or more different cellular networks such as, but not limited to, a Long Term Evolution (LTE) network, an advanced LTE network, a New Radio (NR)/5G network, a Narrowband Internet of Things (NB-IoT), or any other next generation networks. The PLMN 102a can be operated by a mobile network operator (MNO). The PLMN 102a can be configured to provide communication services provided by the MNO to the UEs 104 in a specific region. Examples of the communication services can be, but is not limited to, a streaming service (streaming of multimedia data such as audio, video, text and so on), a file download service, a carousel service (a service for combining file download service and streaming service), a television (TV) service, an Internet Protocol (IP) Multimedia Subsystem (IMS) service, a non-3GPP service (for example: firewalling or the like), and so on. Embodiments herein use the terms such as "PLMN", "cellular network", "public network", "3GPP access network", and so on interchangeably to refer to a network that provides the communication services to public use in a given region.

The NPN(s) 102b can be configured to provide coverage and private services to the UEs 104 present within a location such as, but not limited to, an organization, an enterprise, a factory, a campus, a room, a floor, and so on. The private services can include services that are defined by the premises. Examples of the private services can be, but is not limited to, a streaming service (streaming of multimedia data such as audio, video, text and so on), a file download service, and so on.

In an embodiment, the NPN 102b can be deployed as a non-stand alone NPN. The non-stand alone NPN 102b can be deployed in conjunction with the PLMN 102a. The NPN 102b can be deployed in conjunction with the PLMN 102a using a network slicing and/or a Closed Access Group (CAG) cell (as specified in 3GPP TS 23.501). The network slicing provides dedicated data network names (DNNs) networks, or one or more network slice instances that can make the NPN 102b available to the UEs 104 via the PLMN 102a. The CAG can be identified using a CAG identifier (CAG ID) that is broadcasted by the NPN/CAG cell 102b, wherein the CAG ID is unique with respect to a PLMN ID. The CAG may be used by the NPN 102b to prevent users/UEs from automatically selecting and registering from a location/region/area, which does not provide access to the NPNs for the UEs 104, or from the location, which the UEs 104 are not allowed to access the NPNs. Embodiments herein use the term "CAG Identifier" and "non-public network identifier" interchangeably. The CAG ID can mean CAG-ID and/or NPN-ID. Embodiments herein use the terms such as, but not limited to, "NPN", "private network", "public network integrated NPN", "non-3GPP access network", "non-standalone NPN", "CAG cells", and so on interchangeably to refer to a network that confines the communication services within boundaries of the defined premises for the UEs 104.

In an embodiment, the NPN 102b can be a standalone NPN. The stand-alone NPN 102b may be deployed without the support of the PLMNs. The stand-alone NPN 102b may use the CAG and/or a non-public network identifier to identify a group of subscribers/UEs, who are permitted to access the one or more CAG cells/NPN. Embodiments herein are further explained considering the non-standalone NPN 102b, but the standalone NPN can also be considered, where the entities in the PLMN core network 102a are hosted by the NPN core network 102b.

The UE(s) 104 referred herein can be a user device that is capable of supporting the PLMN 102a and the NPN 102b. Examples of the UE 104 can be, but is not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a USB dongle, a sensor, a robot, an auto-guided vehicle, and so on. The UE 104 can include one or more processors/Central Processing Units (CPUs), a memory, a transceiver, and so on, for performing at least one intended function/operation.

The UE 104 can be configured to access the PLMN 102a and/or the NPN 102b for obtaining the communication services and/or the private services. In an embodiment, the UE 104 can access the PLMN 102a via the NPN 102b. In an embodiment, the UE 104 can access the NPN and obtain the private network services provided by the NPN 102b by having subscriptions to the PLMN. The UE's subscription to PLMN may include at least one of NPN permissions/subscriptions and permissions/subscriptions to access the CAG cell(s)NPN(s) 102b. The NPN permissions may indicate that the UE 104 is authorized to access the NPN/the services provided by the NPN 102b via the PLMN 102a. The permissions to access the CAG cell/NPN 102b can indicate an allowed list of CAG cells/CAG IDs for the UE 104. The permissions to access the CAG cells can be configured for the UE 104 based on its NPN permissions. The permissions to access the CAG cells/allowed CAG list is configured for the UE 104 using existing 3GPP procedures (for example: over the air mechanism, UE configuration update procedure, or the like). Embodiments herein use the terms such as "permissions to access the CAG cell", "CAG cell permissions", "allowed list of CAG cells/CAG IDs", "allowed CAG cells permissions" and so on interchangeably.

The UE 104 initiates a registration procedure when the UE 104 wants the access to the CAG cell/NPN 102b or to the services provided by the NPN 102b. The UE 104 sends a registration request to the PLMN 102a by requesting access to the CAG cell/NPN 102b. In an example herein, the requested PLMN 102a can be a home PLMN (HLPMN), with which the UE 104 has already subscribed. In an embodiment, on receiving the registration request from the UE 104, the PLMN 102a verifies if the UE 104 has the permissions (or if the UE 104 is authorized) to access the requested CAG cell/NPN 102b. On verifying that the UE 104 is authorized/or the UE 104 has the permissions to access the requested CAG cell/NPN 102a, the PLMN 102a performs a primary authentication procedure to check if the UE 104 is an authenticated UE 104. Based on the successful authentication, the PLMN proceeds further with UE's registration request procedure for UE's access to the NPN.

On verifying that the UE 104 does not have the permissions (or the UE 104 is not authorized) to access the requested CAG cell/NPN 102b, the PLMN 102a rejects the registration request of the UE 104 and does not enable the UE 104 to access the requested CAG cell/NPN 102b. Thus, verifying by the PLMN 102a the permissions/authorization of the UE 104 to access the NPN 102b before performing the primary authentication procedure mitigates the (D)DoS attack on the PLMN 102a, which is resulting from the registration procedure initiated by the UE 104 with no valid permissions to access the CAG cell/NPN 102b.

As depicted in FIG. 1b, the NPN 102b includes a non-public Radio Access Network (RAN) 106b, and a non-public Core Network (CN) 108b. The non-public RAN 106b referred herein can be 3GPP access nodes, non-3GPP access nodes, and so on. Examples of the 3GPP access nodes can be, but not limited to, evolved nodes (eNBs), New Radio nodes (gNBs), and so on. Examples of the non-3GPP access nodes can be, but is not limited to, a Local Access Network (LAN) node, a Wireless LAN (WLAN) node, a Wi-Fi node, and so on. The non-public RAN 106b of the NPN 102b can be a RAN of the PLMN 102a including an assistance of the CAG cell. The PLMN 102a hosts the RAN 106b to access the NPN 102b. The non-public RAN 106b can be configured to connect the at least one UE 104 to the non-public CN 108b. The non-public CN 108b can be configured to connect the UE 104 to the external data network/PLMN 102a. The non-public CN 108b can be at least one of an EPC network, a 5GC core network, and so on. In an embodiment, the NPN 102b can share the non-public RAN 106b with the PLMN 102a. The NPN 102b and the PLMN 102a can include different identifiers (IDs), segregated spectrum bands, and functionalities of the CNs (for example, user plane and data plane functionalities of the CNs). In an embodiment, the NPN 102b can partially share the non-public RAN 106b with the PLMN 102a, so that one or more of the functions of the non-public RAN 106b serving the NPN 102b can be provided by the PLMN 102a. In an embodiment, the NPN 102b can share the non-public RAN 106b and the spectrum bands with the PLMN 102a. In an embodiment, the NPN 102b can share the non-public RAN 106b and the control plane functionalities of the non-public CN 108b with the PLMN 102a.

The PLMN 102a includes at least one cellular network 106 comprising of at least one RAN 106a, and a CN 108a. The RAN 106a can be configured to connect the at least one UE 104 to the CN 108a. The RAN 106a may comprise of nodes/Base Stations (BSs) such as, but not limited to, evolved nodes (eNBs), New Radio nodes (gNBs), and so on. The RAN 106a may comprise of or more processors/Central Processing Units (CPUs), a memory, a transceiver, and so on, for performing at least one intended function/operation.

The CN 108a referred herein can be at least one of an Evolved Packet Core (EPC), a 5G core (5GC) network, or the like. The CN 108a can be connected to the RAN 106a and an external data network. Examples of the external data network can be, but not limited to, the Internet, a Packet Data Network (PDN), an Internet Protocol (IP) Multimedia Core Network Subsystem, and so on. In an embodiment, the CN 108a can be connected to the non-public CN 108b over the N3IWF interface. Embodiments herein use the terms such as "core network (CN)", "serving network", and so on interchangeably.

The CN 108a may comprise of one or more processors/Central Processing Units (CPUs), a memory, a storage, a transceiver, and so on, for performing at least one intended function/operation. The CN 108a can be configured to maintain information about at least one of NPN permissions of the UE 104, a subscription permanent identifier (SUPI) of the UE 104, and the allowed list of CAG cells/CAG IDs configured for the UE 104, a mapping of the allowed list of CAG cells with the SUPI of the UE 104, and so on. The allowed list of CAG cells can be configured for the UE 104 based on the valid NPN permissions of the UE 104. The allowed list of CAG cells may include information about the CAG IDs of the CAG cells/NPNs 102b, which the UE 104 can access. The SUPI can be a unique identifier that is allocated to the UE 104 by the MNO during a Universal Subscriber Identity Module (USIM) registration process performed by the UE 104 to register with the network system 100. The SUPI can be either an International Mobile Subscriber Identifier (IMSI) (as specified in TS 23.503) or a Network Access Identifier (NAI) (as specified in TS 23.0003), and so on.

The CN 108a can be configured to connect the at least one UE 104 (connected with the at least one RAN node 106a) to an external data network. The CN 108a can also be configured to enable the UE(s) 104 to access the NPN 102b. In an embodiment, the CN 108a can enable the UE(s) 104 to access the NPN 102b by verifying the permissions of the UE 104 to access the NPN 102b before performing the primary authentication procedure, thereby mitigating the (D)DoS attack and minimizing the overhead on the PLMN 102a.

As depicted in FIG. 1b, for accessing the NPN 102b or obtaining the services provided by the NPN 102b, the UE 104 performs the registration procedure with the CN 108a of the PLMN 102a. The UE 104 performs the registration procedure by sending the registration request to the connected RAN 106a of the PLMN 102a requesting the access to the NPN 102b or to the services provided by the NPN 102b. The registration request includes a subscribed concealed identifier (SUCI) of the UE 104. The SUCI can be a privacy preserving identifier containing a concealed SUPI. In an example, the UE 104 may generate the SUCI using an Elliptic Curve Integrated Encryption Scheme (ECIES)-based protection scheme with a public key of the home network/HPLMN 102a that was securely provisioned to the UE 104 during the USIM registration. The UE 104 can send the registration request including the SUCI to the NG-RAN 106a in an initial Non-Access Stratum (NAS) message, or any NAS message (for example, Identity Response message, or the like).

On receiving the SUCI from the UE 104, the RAN 106a identifies the CAG ID of the requested CAG cell/NPN 102b (based on the broadcast of the CAG IDs by the CAG cells/NPNs 102b). The RAN 106a forwards the received SUCI of the UE 104 and the identified CAG ID of the requested CAG cell/NPN 102b to the CN 108a. In an embodiment, the RAN 106a may also receive the CAG ID of the requested CAG cell/NPN 102b from the UE 104.

On receiving the SUCI of the UE 104 and the CAG ID of the requested CAG cell/NPN 102b, the CN 108a verifies the permissions of the UE 104 to access the requested CAG cell/NPN 102b before performing the primary authentication procedure. For verifying the permissions, the CN 108a reveals the received SUCI to the SUPI (as specified in 3GPP TS. 23.501). The CN 108a retrieves the allowed list of CAG cells/CAG IDs for the UE 104 based on the revealed SUPI. The CN 108a uses the maintained mapping of the allowed list of CAG cells with the SUPI of the UEs 104 and retrieves the allowed list of CAG cells for the revealed SUPI. The CN 108a checks if the received CAG ID of the requested CAG cell/NPN 102a is present in the retrieved allowed list of cells/CAG IDs for the UE 104.

On checking that the received CAG ID of the requested CAG cell/NPN 102a is present in the retrieved allowed list of cells/CAG IDs for the UE 104, the CN 108a verifies that the UE 104 has the permission to access the CAG cell/NPN 102b (a successful verification). Thereafter, the CN 108a performs the primary authentication procedure to authenticate if the UE 104 has the valid NPN permissions to access the requested NPN 102b via the PLMN 102a. For performing the primary authentication procedure, the CN 108a generates an authentication vector based on the received SUCI (as specified in 3GPP TS 23.501) and authenticates the UE 104 based on the generated authentication vector. Once the authentication procedure is successful, the CN 108a enables the UE 104 to access the requested CAG cell/NPN 102b by performing a procedure as specified in 3GPP TS 23.501.

On checking that the received CAG ID of the requested CAG cell/NPN 102a is not present in the retrieved allowed list of cells/CAG IDs for the UE 104, the CN 108a verifies that the UE 104 does not have the permissions to access the CAG cell/NPN 102b (an unsuccessful verification). The CN 108a then rejects the registration request of the UE 104 without proceeding with the primary authentication procedure. On rejecting the registration request, the CN 108a sends a reject message to the UE 104 through the RAN 106a indicating that the requested CAG cell/NPN 102b access is not allowed. The CN 108a also sends an appropriate cause value along with the reject message to the UE 104. The cause value can be a value depicting a cause of an error due to which the UE 104 cannot access the requested CAG cell/NPN 102b or the services provided by the requested CAG cell/NPN 102b at a present location. Examples of the cause value can be, but not limited to, #12, #13, #15, #76, and so on. In an example, the cause value #15 indicates that there are no suitable CAG cells in a location/tracking area (wherein the UE 104 is present) of the HPLMN 102a or the CAG cells access is not allowed for the UE 104. In an example, the cause value #12 indicates that the CAG cell access in the requested tracking area is not allowed. In an example, the cause value #13 indicates that roaming is not allowed for the requested tracking area.

Thus, verifying the permissions of the UE 104 to access the CAG cell before performing the primary authentication procedure mitigates the (D)DoS on the CN 108a and reduces overheads on the CN 108a for performing the primary authentication procedure.

In an embodiment, the PLMN 102a may deploy a CAG server 110, which can communicate with the CN 108a of the at least one cellular network 106 as depicted in FIG. 1c. The CAG server 110 can perform at least one intended function of the CN 108a. The CAG server 110 can maintain information about at least one of NPN permissions of the UE 104, the SUPI of the UE 104, and the allowed list of CAG cells/CAG IDs configured for the UE 104, the mapping of the allowed list of CAG cells with the SUPI of the UE 104, and so on. The CAG server 110 can verify the permissions of the UE 104 to access the NPN 102b before performing the primary authentication procedure.

Figure 2:
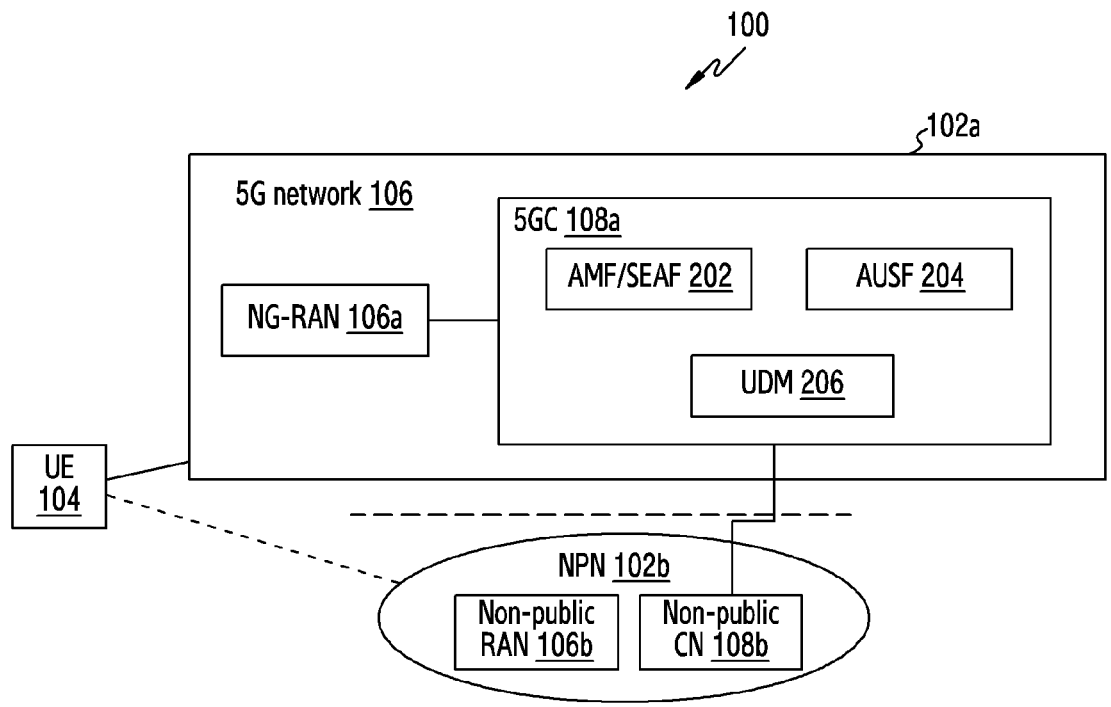
FIG. 2 depicts various elements of the wireless network 100 configured for mitigating a (Distributed) Denial of Service (D)DoS attack, according to embodiments as disclosed herein.

FIG. 2 is a block diagram depicting various elements of the wireless network 100 configured for mitigating the (D)DoS attack, according to embodiments as disclosed herein. Embodiments herein are further explained by considering that the PLMN 102a includes a 5G network 106 as the cellular network 106 and the non-public CN 108b as the 5GC 108b as examples, but any other cellular network and any other CN can be considered.

As depicted in the example in FIG. 2, the RAN 106a of the 5G network/PLMN 102a can be the NG-RAN/gNB 106a and the CN 108a can be the 5GC 108a. The 5GC 108a includes an access and mobility management function (AMF)/security anchor function (SEAF) 202, an authentication server function (AUSF) 204, and a unified data management (UDM)/an authentication credential Repository (ARPF)/subscription identifier revealing function 206. The CN 108a also includes other elements such as, but not limited to, a session management function (SMF), a user plane functionality (UPF), a policy control function, an application function, a network exposure function (NEF), a NF repository function (NRF), a network slice selection function (NSSF), and so on (not shown). In an embodiment, the CAG server 110 can communicate with the elements of the 5GC 108a over a service interface exhibited by the CAG server 110. In an example, the service interface can be a Ncag_XXX interface. Similarly, the non-public CN 108b/non-public 5GC 108a includes all the elements of the 5GC 108a (not shown).

In an embodiment, if the SEAF and the AMF 202 are not co-located, then the AMF 202 connects to the AUSF 204 via the SEAF. In an embodiment herein, if the SEAF and the AMF are co-located, then the term "AMF" means "AMF/SEAF" 202 throughout this document.

The AMF/SEAF 202 can be configured to support functions such as, but not limited to, termination of NAS signaling, NAS ciphering and integrity protection, registration management, connection management, mobility management, access authentication and authorization, security context management, and so on. The AUSF 204 can be an authentication server configured to authenticate the UEs 104 by maintaining information about the UEs 104.

The UDM/ARPF/SIDF 206 can be configured to perform functions such as, but not limited to, generation of authentication and key agreement (AKA) credentials, user identification handling, access authorization, subscription management, and so on. In an embodiment herein, the UDM, the ARPF, and the SIDF may or may not operate mutually to perform the at least one function.

Embodiments herein enable at least one of the UDM 206, the UDM/ARPF/SIDF 206, the AUSF 204, the AMF/SEAF 202, and the CAG server 110 to verify if the UE 104 is authorized (or the UE has the permissions) to access the CAG cell/NPN 102b before performing the primary authentication procedure.

Embodiments herein enable the UDM 206 of the 5GC 108a to verify the permissions of the UE 104 to access the CAG cells/NPN 102b. As a part of the registration procedure, for accessing the CAG cell/NPN 102b, the UE 104 sends the registration request including the SUCI to the NG-RAN 106a. In an embodiment, the UE 104 may send the registration request to the NG-RAN 106a in the initial NAS message. In an embodiment, the UE 104 may send the registration request to the NG-RAN 106a in a NAS message (for example, in an Identity Response Message). The NG-RAN 106a forwards the received SUCI of the UE 104 to the AMF/SEAF 202. In an embodiment, the NG-RAN 106a identifies the CAG ID broadcasted by the requested CAG cells/NPN 102b and adds the CAG ID to the SUCI for sending to the AMF/SEAF 202 over an N2 message. In an embodiment, the NG-RAN 106a receives the CAG ID (that is broadcasted by the requested CAG cell/NPN 102a) along with the SUCI from the UE 104. In such a case, the NG-RAN 106a forwards the SUCI along with the CAG ID to the AMF/SEAF 202.

The AMF/SEAF 202 includes the received SUCI of the UE 104, the CAG ID of the requested CAG cell/NPN 102b, other parameters in an authentication request message (Nausf_UEAuthentication_Authenticate request message) and sends the authentication request message to the AUSF 204. Examples of the other parameters can be, but not limited to, a SN name, or the like. The AUSF 204 derives the SUCI of the UE 104, the CAG ID of the requested CAG cell/NPN 102*b*, and the other parameters from the received authentication request message. The AUSF 204 inserts the derived SUCI of the UE 104, the CAG ID of the requested CAG cell/NPN 102*b*, and the other parameters in an authentication get request message (Nudm_UEAuthentication_Get_Request message). The AUSF 204 sends the authentication get request message to the UDM 206 of the 5GC 108*a*.

On receiving the authentication get request message, the UDM 206 checks if the CAG ID is present in the received message. If the CAG ID is present in the received message, the UDM 206 verifies the permissions of the UE 104 to access the requested CAG cell/NPN 102*b* before performing the primary authentication procedure. For verifying the permissions, the UDM 206 reveals the received SUCI to the SUPI (as specified in 3GPP TS 23.501). The UDM 206 retrieves the allowed list of CAG cells/CAG IDs for the UE 104 based on the revealed SUPI. The UDM 206 uses the maintained mapping of the allowed list of CAG cells with the SUPI of the UEs 104 to retrieve the allowed list of CAG cells for the revealed SUPI. The UDM 206 checks if the received CAG ID of the requested CAG cell/NPN 102*a* is present in the retrieved allowed list of cells/CAG IDs for the UE 104.

On checking that the received CAG ID of the requested CAG cell/NPN 102*a* is present in the retrieved allowed list of cells/CAG IDs for the UE 104, the UDM 206 verifies that the UE 104 has the permissions to access the CAG cell/NPN 102*b*. On verifying that the UE 104 has the permissions to access the CAG cell, the UDM 206 selects an authentication method, and generates the authentication vector (following procedures specified in 3GPP TS 23.501). The UDM 206 sends the generated authentication vector to the AMF/SEAF 202 through the AUSF 204 to perform the primary authentication procedure. On receiving the authentication vector from the UDM 206, the AMF/SEAF 202 authenticates the UE 104 and enables the UE 104 to access the NPN 102*b* on the successful authentication.

If the received CAG ID of the requested CAG cell/NPN 102*a* is not present in the retrieved allowed list of cells/CAG IDs for the UE 104, the UDM 206 verifies that the UE 104 does not have the permissions to access the CAG cell/NPN 102*b*. After verifying that the UE 104 does not have the permissions to access the CAG cell/NPN 102*b*, the UDM 206 does not proceed with the primary authentication procedure. The UDM 206 inserts the SUPI, and a CAG cell reject message in a get response message (Nudm_UEAuthentication_Get Response message) and sends the get response message to the AUSF 204.

On receiving the response message including the CAG cell reject message, the AUSF 204 includes the received CAG cell reject message in an authentication response message (Nausf_UEAUthentication_Authenticate response message) and forwards the authentication response message to the AMF/SEAF 202.

On receiving the authentication response message including the CAG cell reject message from the AUSF 204, the AMF/SEAF 202 rejects the received registration request of the UE 104. The AMF/SEAF 202 sends a registration reject message with the appropriate cause value to the UE 104. The cause value indicates that the UE 104 cannot access the requested CAG cell/NPN 102*b* or the services provided by the requested CAG cell/NPN 102*b*.

By performing the check at the UDM 206, the (D)DoS attack on the network is minimized without reducing the level of the 5GS security, that is not revealing the SUPI to the AMF 202 before the primary authentication to maintain the user privacy, but performing the authorization efficiently and not providing any information to the UE 104 other than cause value/error cause.

Embodiments herein enable the UDM 206 and/or the AUSF 204 to verify the permissions of the UE 104 to access the CAG cells/NPN 102*b*. For accessing the CAG cells/NPN 102*b* or the services provided by the NPN 102*b*, the UE 104 sends the registration request along with the SUCI to the NG-RAN 106*a*. The NG-RAN 106 forwards the received SUCI of the UE 104 to the AMF/SEAF 202. The AMF/SEAF 202 may receive the SUCI from the NG-RAN 106 and the CAG cell ID either from the NG-RAN 106*a* or from the UE 104 in the registration request message. The AMF/SEAF 202 includes the received SUCI of the UE 104, the CAG ID of the requested CAG cell/NPN 102*b*, and the other parameters in at least one of a Nausf_XXX Request message and a Nausf_UEAuthentication_Authenticate Request message. The AMF/SEAF 202 sends at least one of the Nausf_XXX Request message, and the Nausf_UEAuthentication_Authenticate Request message to the AUSF 204.

The AUSF 204 includes the received SUCI of the UE 104, the CAG ID of the requested CAG cell/NPN 102*b*, and the other parameters in at least one of the Nudm_XXX Request message and the Nudm_UEAuthentication Get Request message for sending to the UDM 206.

In an embodiment, on receiving the registration request message including the SUCI and the CAG ID from the AUSF 204, the UDM 206 reveals the SUCI to the SUPI (as per the 3GPP TS 33.501) and derives the allowed list of the CAG cells for the UE 104 based on the SUPI. The UDM 206 verifies if the UE 104 has the permissions to the requested CAG cell/NPN 102*b* based on the allowed list of the CAG cells for the UE 104 and the received CAG ID of the requested CAG cell/NPN 102*b*. On verifying that the UE 104 has the permissions to the requested CAG cell/NPN 102*b*, the UDM 206 sends the accept message to the AUSF 204 in at least one of the Nudm_XXX Response message and the Nudm_UEAuthentication Get Response message. The AUSF 204 further forwards the accept message to the AMF/SEAF 202 in at least one of the Nausf_XXX Response message and the Nausf_UEAuthentication_Authenticate Response message. The AMF/SEAF 202 may further perform the primary authentication procedure to authenticate the UE 104 for accessing the CAG cell/NPN 102*b*.

On verifying that the UE 104 does not have the permissions to the requested CAG cell/NPN 102*b*, the UDM 206 sends the CAG cell reject message along with the SUPI of the UE 104 to the AUSF 204 in at least one of the Nausf_XXX Response message and the Nausf_UEAuthentication_Authenticate Response message. The AUSF 204 forwards the received CAG cell reject message to the AMF/SEAF 202 in at least one of the Nausf_XXX Response message and the Nausf_UEAuthentication_Authenticate Response message. The AMF/SEAF 202 rejects the registration request message of the UE 104 with the appropriate cause value.

In an embodiment, on receiving the registration request message including the SUCI and the CAG ID from the AUSF 204, the UDM 206 reveals the SUCI to the SUPI and derives the allowed list of the CAG cells for the UE 104 based on the SUPI. The UDM 206 may further send the allowed list of CAG cells for the UE 104 to the AUSF 204 in at least one of the Nausf_XXX Response message and the Nausf_UEAuthentication_Authenticate Response message for verifying the permissions of the UE 104. Based on the received allowed list of CAG cells from the UDM 206 and the received CAG ID of the requested CAG cell from the AMF/SEAF 202, the AUSF 204 verifies if the UE 104 has the permissions to access the requested CAG cells/NPN 102*b*. On verifying that the UE 104 has the permissions to access the requested CAG cells/NPN 102*b*, the AUSF 204 forwards the accept message to the AMF/SEAF 202 in at least one of the Nausf_XXX Response message and the Nausf_UEAuthentication_Authenticate Response message. The AMF/SEAF 202 may further perform the primary authentication procedure to authenticate the UE 104 for accessing the CAG cell/NPN 102*b*.

On verifying that the UE 104 does not have the permissions to the requested CAG cell/NPN 102*b* or if the AUSF 204 does not receive the allowed list of CAG cells from the UDM 206, the AUSF 204 sends the CAG cell reject message to the AMF/SEAF 202. The AUSF 204 may send the CAG cell reject message to the AMF/SEAF 202 in at least one of the Nausf_XXX Response message and the Nausf_UEAuthentication_Authenticate Response message. The AMF/SEAF 202 then rejects the registration request message of the UE 104 with the appropriate cause value.

Embodiments herein enable the UDM 206 of the 5GC 108*a* to verify the permissions of the UE 104 to access the CAG cells/NPN 102*b* by communicating directly with the AMF/SEAF 202. For accessing the CAG cells/NPN 102*b* or the services provided by the NPN 102*b*, the UE 104 sends the registration request along with the SUCI to the NG-RAN 106*a*. The NG-RAN 106*a* forwards the received SUCI of the UE 104 to the AMF/SEAF 202. The AMF/SEAF 202 may receive the SUCI from the NG-RAN 106*a* and the CAG cell ID either from the NG-RAN 106*a* or from the UE 104 in the registration request message. The AMF/SEAF 202 directly requests the UDM 206 to verify if the UE 104 has the permissions to access the CAG cells/NPN 102*b*. In an embodiment, the AMF/SEAF 202 may directly request the UDM 206 to verify the permissions of the UE 104 over service interfaces provided by the UDM 206 such as, but not limited to, a Nudm_XXX over Nudm interface, an N8 interface, Nudm_UEVerifyCAGAccess_Get, and so on. The AMF/SEAF 202 includes the received SUCI of the UE 104, the CAG ID of the requested CAG cell/NPN 102*b*, and the other parameters in at least one of a Nudm_XXX Request message, a Nudm_UEVerifyCAGAccess_Get Request message and sends the message to the UDM 206.

In response to requesting by the AMF/SEAF 202, the UDM 206 reveals the received SUCI to the SUPI and retrieves the allowed list of CAG cells for the UE 104 based on the revealed SUPI. The UDM 206 verifies if the UE 104 has the permissions to access the CAG cells/NPN 102*b* using the allowed list of CAG cells for the UE 104 and the received CAG ID of the requested CAG cell/NPN 102*b*. On verifying that the UE 104 has the permissions to access the CAG cell/NPN 102*b*, the UDM 206 may send an accept message to the AMF/SEAF 202, which may further perform the primary authentication procedure to authenticate the UE 104 for accessing the CAG cell/NPN 102*b*. The UDM 206 may send the accept message to the AMF/SEAF 202 in at least one of a Nudm_XXX Response message, and a Nudm_UEVerifyCAGAccess_Get Response message.

On verifying that the UE 104 does not have the permissions to access the CAG cell/NPN 102*b*, the UDM 206 may send a reject message to the AMF/SEAF 202 indicating that the UE 104 does not have the permissions to access to the CAG cell/NPN 102*b*. The UDM 206 may send the reject message to the AMF/SEAF 202 in at least one of the Nudm_XXX Response message, and the Nudm_UEVerifyCAGAccess_Get Response message. On receiving the reject message from the UDM 206, the AMF/SEAF 202 rejects the registration request of the UE 104 and sends the reject message along with the appropriate cause value to the UE 104.

Embodiments herein enable the UDM to verify the permissions of the UE 104 to access the CAG cells/NPN 102*b* on receiving the SUPI from the AMF/SEAF 202 on receiving the SUPI from the AMF/SEAF 202. In an embodiment, the UE 104 initiates the service request procedure for accessing the CAG cells/NPN 102*b* by sending the service request message to the AMF/SEAF 202 through the NG-RAN 106*a*. In an embodiment, the UE 104 can initiate the request procedure for accessing the CAG cells/NPN 102*b* by sending the registration request message including the SUCI of the UE 104 to the AMF/SEAF 202 through the NG-RAN 106*a*, when the AMF/SEAF 202 may not be able to reveal the SUPI of the UE 104. The AMF/SEAF 202 may receive the CAG ID of the requested CAG cell/NPN 102*b* either from the NG-RAN 106*a* or from the UE 104 in the service request message. On receiving the service request of the UE 104, the AMF/SEAF 202 may reveal the SUPI (for example: from UE's 5G-GUTI or the like so) of the UE 104. If the AMF/SEAF 202 does not have the information (the allowed list of CAG cells for the UE 104) to verify the permissions of the UE 104 to access the CAG cell, the AMF/SEAF 202 provides the SUPI of the UE 104 and the CAG ID of the requested CAG cell to the UDM 206 over the Nudm_XXX message. The UDM 206 performs the verification of the UE's permissions to the CAG cell. If the UDM 206 is unable to verify the UE's permissions to access the CAG cell, the AMF/SEAF 202 sends the NAS Reject message with the appropriate cause value to the UE 104. If the UDM 206 is able to verify the UE's permissions to access the CAG cell, the AMF/SEAF 202 shall proceed further with the NAS/N2 procedure (Registration Request procedure or Path Switch Procedure or N2 HO procedure).

Embodiments herein enable the AMF 202 to verify the permissions of the UE 104 to access the CAG cells/NPN 102*b*. The UE 104 initiates the registration procedure for accessing the CAG cells/NPN 102*b* by sending the registration request message including the SUCI to the AMF 202 through the NG-RAN 106*a*. The AMF 202 may receive the CAG ID of the requested CAG cell/NPN 102*b* either from the NG-RAN 106*a* or from the UE 104 in the registration request message. The AMF/SEAF 202 requests the UDM 206 for the SUPI and the allowed list of CAG cells by forwarding the SUCI of the UE 104 to the UDM 206. In an embodiment, the AMF/SEAF 202 may forward the SUCI of the UE 104 to the UDM 206 in at least one of the Nudm_XXX Request message, and a Nudm_SDM_Get Request message.

On receiving the SUCI of the UE 104 from the AMF/SEAF 202, the UDM 206 reveals the SUCI of the UE 104 to the SUPI and retrieves the allowed list of CAG cells for the UE 104 based on the revealed SUPI. In an embodiment, the UDM may send the SUPI of the UE 104 and the allowed list of CAG cells for the UE 104 to the AMF/SEAF 202 in at least one of the Nudm_XXX Response message, and a Nudm_SDM_Get Response message On receiving the allowed list of CAG cells for the UE 104 from the UDM 206, the AMF/SEAF 202 verifies if the CAG ID of the requested CAG cell is present in the allowed list of CAG cells. If the CAG ID of the requested CAG cell is present in the allowed list, the AMF/SEAF 202 determines that the UE 104 has the permissions to the CAG cell/NPN 102*b*, and proceeds further with the primary authentication procedure to authenticate the UE 104 for accessing the NPN 102*b*. If the CAG ID of the requested CAG cell is not present in the allowed list or if the AMF/SEAF 202 does not receive the allowed list from the UDM 206, the AMF/SEAF 202 determines that the UE does not have the permissions to the CAG cell/NPN 102b. Thereafter, the AMF/SEAF 202 rejects the registration request of the UE 104 with the appropriate cause value.

Embodiments herein enable the CAG server 110 to verify the permissions of the UE 104 to access the CAG cell/NPN 102a on receiving a request from the UDM 206. The UDM 206 receives the registration request message of the UE 104 including the SUCI of the UE 104 and the CAG ID from the AMF/SEAF 202 or the AUSF 204. The UDM 206 checks if the CAG ID is included in the registration request message. If the CAG ID is included in the registration request message, the UDM 206 reveals the SUCI of the UE 104 to the SUPI. The UDM 206 forwards the SUPI of the UE 104 and the CAG ID of the requested CAG cell/NPN 102b to the CAG server 110 over a service based interface provided by the CAG server 110. In an example, the service based interface can be a Ncag_XXX, or the like. The CAG server 110 retrieves the allowed list of CAG cells for the UE 104 based on the received SUPI from the UDM 206. Based on the retrieved allowed list of CAG cells and the CAG ID of the requested CAG cell, the CAG server 110 verifies if the UE 104 has the permissions to access the requested CAG cell. The CAG server 110 sends the result (accept/reject) of the verification to the UDM 206. Based on the response from the CAG server 110, the UDM 206 may proceed further with the registration request of the UE 104 or reject the registration request of the UE 104.

Embodiments herein enable the CAG server 110 to verify the permissions of the UE 104 to access the CAG cell/NPN 102a on receiving a request from the AMF/SEAF 202. The CAG server 110 receives the registration request of the UE 104 from the AMF/SEAF 202, wherein the registration request includes the SUCI of the UE 104 and the CAG ID of the requested CAG cell/NPN 102b. On receiving the registration request of the UE 104, the CAG server 110 forwards the SUCI of the UE 104 to the UDM 206 by requesting for the SUPI of the UE 104. The CAG server 110 may forward the SUCI of the UE 104 to the UDM 206 in the Nudm_XXX message.

On receiving the NUdm_XXX request message, the UDM 206 reveals the obtained SUCI to the SUPI. The UDM 206 provides the SUPI of the UE 104 to the CAG server in the Nudm_XXX Response message. On receiving the SUPI from the UDM 206, the CAG server 110 retrieves the allowed list of CAG cells for the UE 104. Based on the retrieved allowed list of CAG cells and the CAG ID of the requested CAG cell, the CAG server 110 verifies if the UE 104 has the permissions to access the requested CAG cell. The CAG server 110 sends the result (accept/reject) of the verification to the AMF/SEAF 202. Based on the response from the CAG server 110, the AMF/SEAF 202 may proceed further with the registration request of the UE 104 or reject the registration request of the UE 104.

Embodiments herein enable the CAG server 110 to verify if the UE 104 has the permissions to access to the CAG cells/NPN 102b on receiving a request from the AUSF 204. The AMF/SEAF 202 receives the registration request of the UE 104 through the NG-RAN 106a, wherein the registration request may include the SUCI of the UE 104, and the CAG ID of the requested CAG cell/NPN 102b. The AMF/SEAF 202 includes the SUCI of the UE 104, the CAG ID of the requested CAG cell, and the other parameters in the Nausf_XXX Request message and sends the Nausf_XXX Request message to the AUSF 204. The AUSF 204 includes the SUCI of the UE 104, the CAG ID of the requested CAG cell, and the other parameters in the Ncag_XXX Request message and sends the Ncag_XXX Request message to the CAG server 110.

On receiving the Ncag_XXX Request message, the CAG server 110 reveals the SUCI to the SUPI and retrieves the allowed list of CAG cells/NPN 102b based on the revealed SUPI. Based on the retrieved allowed list of CAG cells and the CAG ID of the requested CAG cell, the CAG server 110 verifies if the UE 104 has the permissions to access the requested CAG cell. If the UE 104 has the permissions to access the requested CAG cell, the CAG server 110 includes the accept message and the allowed list of CAG cells to the AUSF 204 in the Ncag_XXX Response message. On receiving the accept message from the CAG server 110, the AUSF 204 may further proceed with the registration request of the UE 104. If the UE 104 does not have the permissions to access the requested CAG cell, the CAG server 110 includes the reject message and the allowed list of CAG cells to the AUSF 204 in the Ncag_XXX Response message. On receiving the reject message from the CAG server 110, the AUSF 204 includes the CAG cell reject message in the Nausf_XXX Response message and sends the Nausf_XXX Response message to the AMF/SEAF 202. The AMF/SEAF 202 may further reject the registration request of the UE 104.

Embodiments herein enable the CAG server 110 to verify the permissions of the UE 104 to access the CAG cells/NPN 102b on receiving the SUPI from the AMF/SEAF 202. The UE 104 initiates the request procedure for accessing the CAG cells/NPN 102b by sending the service request message to the AMF/SEAF 202 through the NG-RAN 106a. The AMF/SEAF 202 may receive the CAG ID of the requested CAG cell/NPN 102b either from the NG-RAN 106a or from the UE 104 in the registration request message. On receiving the request of the UE 104, the AMF/SEAF 202 may reveal the SUPI of the UE 104 (for example: from UE's 5G-GUTI or the like so). If the AMF/SEAF 202 does not have information to verify the permissions of the UE 104 to access the CAG cell/NPN 102b, the AMF/SEAF 202 provides the SUPI of the UE 104 and the CAG ID of the requested CAG cell to the CAG server 110 in the Ncag_XXX Request message. On receiving the SUPI from the AMF/SEAF 202, the CAG server 110 retrieves the allowed list of CAG cells for the UE 104. Based on the retrieved allowed list of CAG cells and the CAG ID of the requested CAG cell, the CAG server 110 verifies if the UE 104 has the permissions to access the requested CAG cell. The CAG server 110 sends the result (accept/reject) of the verification to the AMF/SEAF 202 in the Ncag_XXX Response message. Based on the response from the CAG server 110, the AMF/SEAF 202 may proceed further with the registration request of the UE 104 or reject the registration request of the UE 104.

FIGS. 1A, 1B, 1C and 2 show various elements/nodes/components of the wireless network 100, but it is to be understood that other embodiments are not limited thereon. In other embodiments, the wireless communication system 100 may include less or a greater number of units. Further, the labels or names of the units are used only for illustrative purpose and does not limit the scope of the embodiments herein. One or more units can be combined together to perform same or substantially similar function in the wireless network 100.

3GPP TS 23.501 specifies Public Network Integrated (Non-standalone) Non-Public Networks as Non-Public Networks (NPNs) which are deployed with the support of public PLMNs using Closed Access Group (CAG) and/or network slicing. When large number of UEs (especially in Industrial/Cellular/Massive IoT), which are rogue or malfunctioning or malicious (compromised or introduced by the attacker) with or without valid subscription, not authorized to access the CAG cell, performs Registration procedures to access the network via CAG cells, then there is an overhead (signalling and also computational) on the network and especially in the UDM, AMF and gNB, as the network needs to de-conceal the SUCI and perform authentication procedure and then check whether the UEs authorization for the CAG cell access. Such attempts in a particular CAG cell or distributed at different CAG cells to access the NPN via the CAG cell, will lead to (Distributed) Denial of Service ((D)DoS) attack on the 5G system. The present disclosure provides novel mechanism for the network to verify an UE's Registration request via CAG cell without performing primary authentication. This method enables the network (UDM/AUSF) to verify an UE's subscription to access a CAG cell (where the UE is requesting the access) based on UE's Subscription concealed identifier (SUCI), before performing the primary authentication. The UDM receives the CAG Identifier and the UE's Subscription identity, from the serving network AMF (via AUSF), and the UDM performs the CAG access check before proceeding further with the authentication procedure. By performing the check at the UDM (instead of doing it at the serving network (AMF)), minimizes the overhead on the network and (D)DoS attack on the network is mitigated without reducing the level of the 5GS security. According to various embodiments, UDM performs the check on UE's access CAG cell and proceeds further with primary authentication procedure based on the result of CAG cell access check. Serving network (AMF) sends the CAG ID (Identifier of the CAG cell where the UE is requesting access) to the UDM via AUSF.

Figure 3:
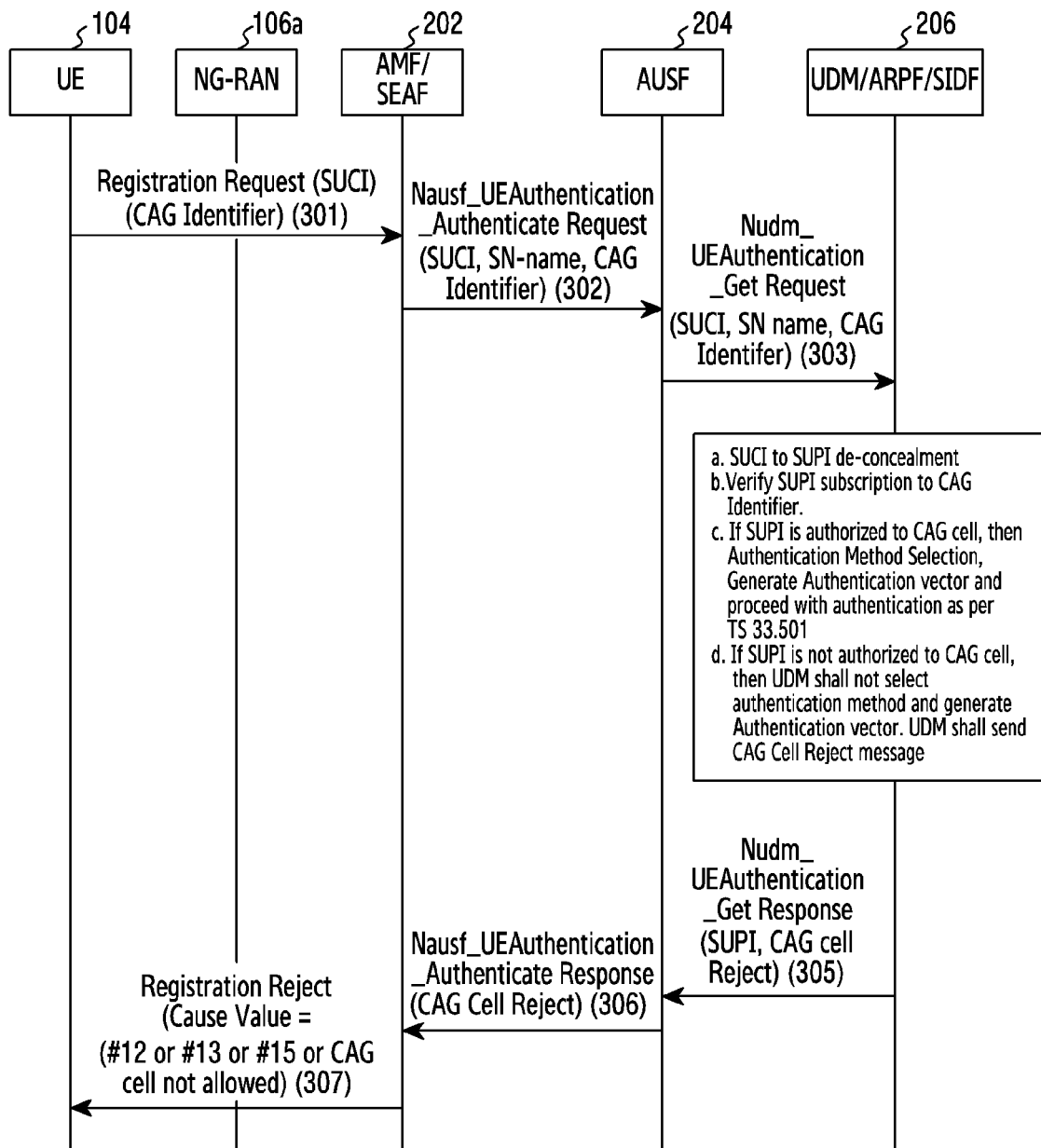
FIG. 3 is a sequence diagram depicting verification of the permissions of the UE to access the CAG cell at the UDM of the 5GC, according to embodiments as disclosed herein.

FIG. 3 is a sequence diagram depicting verification of the permissions of the UE 104 to access the CAG cell at the UDM of the 5GC 108a, according to embodiments as disclosed herein. At step 301, the UE 104 sends the registration request to the AMF/SEAF 202 through the NG-RAN 106a to access the CAG cell/NPN 102b. The registration request includes the SUCI of the UE 104. In an embodiment, the UE 104 may also send the CAG ID of the requested CAG cell/NPN 102b in the registration request. In an embodiment, the NG-RAN 106a may send all the CAG ID(s) of the serving CAG ID(s) along with the registration request to the AMF/SEAF 202.

At step 302, the AMF/SEAF 202 sends the authentication request (Nausf_UEAuthentication_Authenticate Request) message to the AUSF 204 by including the SUCI of the UE 104, the CAG ID of the requested CAG cell, and the other parameters (for example: SN-name or the like) in the authentication request message.

At step 303, the AUSF 204 includes the received SUCI of the UE 104, the CAG ID of the requested CAG cell, and other parameters in the authentication get request (Nudm_UEAuthentication_GetRequest) message and sends the authentication get request message to the UDM/ARPF/SIDF 206.

At step 304, the UDM/ARPF/SIDF 206 verifies the permissions or authorization of the UE 104 to access the requested CAG cell/NPN 102b on receiving the authentication get request message from the AUSF 204. In an embodiment, the UDM/ARPF/SIDF 206 verifies the permissions or authorization of the UE 104 to access the requested CAG cell/NPN 102b before performing the primary authentication procedure. The UDM/ARPF/SIDF 206 reveals the received SUCI to the SUPI and retrieves the allowed list of CAG cells based on the SUPI. The UDM/ARPF/SIDF 206 verifies if the received CAG ID(s) of the requested CAG cell is present in the allowed list of CAG cells based on the SUPI. On verifying that the received CAG ID(s) of the requested CAG cell is present in the allowed list of CAG cells based on the SUPI, the UDM/ARPF/SIDF 206 determines that the UE has the permissions or subscription or the UE is the authorized UE to access the CAG cell/NPN 102b. Thereafter, the UDM/ARPF/SIDF 206 generates the authentication vector based on the SUPI of the UE 104 and performs the primary authentication procedure (as specified in 3GPP TS 33.501) for authenticating the UE 104 in order to allow the UE 104 to access the NPN 102b/services provided by the NPN 102b. On verifying that the received CAG ID of the requested CAG cell is not present in the allowed list of CAG cells based on the SUPI, the UDM/ARPF/SIDF 206 determines that the UE does not have the permissions or subscription or the UE is not authorized to access the CAG cell/NPN 102b. Then, the UDM/ARPF/SIDF 206 includes the error information in the authentication get response message (Nudm_UEAuthentication_GetResponse).

At step 305, the UDM/ARPF/SIDF 206 sends the authentication get response message (for example: 403 Forbidden or the like) to the AUSF. At step 306, the AUSF 204 inserts the reject message of the received authentication get response message in the authentication response (Nausf_UEAUthentication_Authenticate Response). The AUSF 204 sends the authentication response (for example: 403 Forbidden or the like) to the AMF/SEAF 202. At step 307, the AMF/SEAF 202 rejects the registration request of the UE 104 on receiving the reject message from the AUSF 204. The AMF/SEAF 202 sends the reject message with the appropriate cause value (for example: #12, #13, #15, #76 or the like) to the UE 104, wherein the appropriate cause value indicating that the CAG cell access is not allowed. Thus, verifying the permissions/authorization of the UE 104 to access the CAG cell at the UDM before performing the primary authentication minimizes the signaling overhead on the 5GC 108a and mitigates the DoS attack.

According to various embodiments, a method for controlling permissions of at least one User Equipment (UE) to access at least one Non-Public Network (NPN) in a network, the method comprises: requesting, by the at least one UE, a Public Land Mobile Network (PLMN) for accessing the at least one NPN through at least one Closed Access Group (CAG) cell; verifying, by a Core Network (CN) of the PLMN, the permissions of the at least one UE for accessing the requested at least one NPN through the at least one CAG cell; and performing, by the CN, a primary authentication procedure to allow the at least one UE to access the at least one NPN through the at least one CAG cell based on the permissions of the at least one UE for accessing the requested at least one NPN through the at least one CAG cell being verified.

In some embodiments, the at least one NPN is deployed in conjunction with the PLMN using the at least one CAG cell.

In some embodiments, the at least one NPN includes at least one of a non-standalone NPN or a stand-alone NPN.

In some embodiments, at least one of a unified data management (UDM), an access and mobility management function (AMF), or an authentication server function (AUSF) of the CN verifies the permissions of the at least one UE to access the requested at least one NPN through the at least one CAG cell.

In some embodiments, a CAG server coupled to the CN verifies the permissions of the at least one UE to access the requested at least one NPN.

In some embodiments, requesting, by the at least one UE, the access to the at least one NPN includes sending a request including a subscription concealed identifier (SUCI) of the at least one UE to a Radio Access Network (RAN) of the PLMN.

In some embodiments, the method further comprises: adding, by a Radio Access Network (RAN), at least one CAG Identifier (CAG ID) of the at least one NPN that is requested by the at least one UE; and sending, by the RAN, a received subscription concealed identifier (SUCI) of the UE and the at least one CAG ID of the requested at least one NPN to the CN.

In some embodiments, requesting, by the at least one UE, the access to the at least one NPN includes sending the request including a subscription concealed identifier (SUCI) of the at least one UE and at least one CAG Identifier (CAG ID) of the requested at least one NPN to a Radio Access Network (RAN) of the PLMN.

In some embodiments, the CN verifies the permissions of the at least one UE for accessing the at least one NPN based on the received request message including the at least one CAG ID.

In some embodiments, verifying, by the CN, the permissions of the at least one UE includes: receiving a subscription concealed identifier (SUCI) of the at least one UE and at least one CAG Identifier (CAG ID) of the requested at least one NPN from a Radio Access Network (RAN); deriving an allowed list of CAG cells for the at least one UE based on the received SUCI of the at least one UE; and verifying the permissions of the at least one UE to access the requested at least one NPN using the derived allowed list of CAG cells and the received at least one CAG ID of the requested at least one NPN.

In some embodiments, deriving the allowed list of CAG cells for the at least one UE includes: revealing the received SUCI of the at least one UE to a subscription permanent identifier (SUPI); mapping the revealed SUPI of the at least one UE with a map of the allowed list of CAG cells and the SUPIs of a plurality of UEs; and deriving the allowed list of CAG cells for the at least one UE based on the associated SUPI mapping with the revealed SUPI of the at least one UE.

In some embodiments, verifying the permissions of the at least one UE using the derived allowed list of CAG cells and the received CAG ID of the requested at least one NPN includes: determining the received at least one CAG ID of the requested at least one NPN is present in the derived allowed list of CAG cells; verifying that the at least one UE has the permissions for accessing the requested at least one NPN based on the at least one received CAG ID of the requested at least one NPN being present in the derived allowed list of CAG cells; and verifying that the at least one UE does not have the permissions for accessing the requested at least one NPN based on the received at least one CAG ID of the requested at least one NPN not being present in the derived allowed list of CAG cells.

In some embodiments, the method further comprises rejecting the request of the at least one UE on verifying that the at least one UE does not have the permissions for accessing the requested at least one NPN; and sending a reject message to the at least one UE with a cause value, wherein the cause value indicates at least one cause of an error for rejecting the request of the at least one UE.

In some embodiments, performing the primary authentication procedure includes: generating an authentication vector based on a revealed subscription permanent identifier (SUPI) of the at least one UE based on verifying that the at least one UE has the permissions for accessing the requested at least one NPN; authenticating the at least one UE based on the generated authentication vector based on determining that the at least one UE has NPN permissions to access the requested at least one NPN through the PLMN; and enabling the at least one UE to access the requested at least one NPN based on the at least one UE having the NPN permissions to access the requested at least one NPN through the PLMN.

According to various embodiments, a network comprises at least one User Equipment (UE); at least one Non-Public network (NPN); and a Public Land Mobile Network (PLMN). The at least one NPN is deployed in conjunction with the PLMN, the PLMN includes at least one cellular network comprising of a Radio Access Network (RAN) and a Core Network (CN), the at least one UE is configured to request the PLMN for accessing the at least one NPN through at least one Closed Access Group (CAG) cell, and the CN is configured to: verify permissions of the at least one UE for accessing the requested at least one NPN via the at least one CAG cell, and perform a primary authentication procedure to allow the at least one UE to access the at least one NPN through the at least one CAG cell, based on the permissions of the at least one UE for accessing the requested at least one NPN through the at least one CAG cell being verified.

In some embodiments, the at least one NPN is deployed in conjunction with the PLMN using the at least one CAG cell.

In some embodiments, the at least one NPN includes at least one of a non-standalone NPN or a stand-alone NPN.

In some embodiments, at least one of a unified data management (UDM), an access and mobility management function (AMF), or an authentication server function (AUSF) of the CN is further configured to verify the permissions of the at least one UE to access the requested at least one NPN through the at least one CAG cell.

In some embodiments, the PLMN further comprises a CAG server coupled with the CN configured to verify the permissions of the at least one UE to access the requested at least one NPN.

In some embodiments, the at least one UE is further configured to send a request including a subscription concealed identifier (SUCI) of the at least one UE to the RAN of the PLMN requesting access to the at least one NPN.

In some embodiments, the at least one RAN is further configured to: add at least one CAG identifier (CAG ID) of the at least one NPN that is requested by the at least one UE; and send a received subscription concealed identifier (SUCI) of the UE and the CAG ID of the requested at least one NPN to the CN.

In some embodiments, the at least one UE is further configured to send the request including a subscription concealed identifier (SUCI) of the at least one UE and a CAG Identifier (CAG ID) of the requested at least one NPN to the RAN of the PLMN.

In some embodiments, the CN is further configured to verify the permissions of the at least one UE for accessing the at least one NPN based on the received request messages including the at least one CAG ID.

In some embodiments, the CN is further configured to: receive a subscription concealed identifier (SUCI) of the at least one UE and at least one CAG Identifier (CAG ID) of the requested at least one NPN from the RAN; derive an allowed list of CAG cells for the at least one UE based on the received SUCI of the at least one UE; and verify the permissions of the at least one UE to access the requested at least one NPN using the derived allowed list of CAG cells and the received at least one CAG ID of the requested at least one NPN.

In some embodiments, the CN is further configured to: reveal the received SUCI of the at least one UE to a subscription permanent identifier (SUPI); map the revealed SUPI of the at least one UE with a map of the allowed list of CAG cells and the SUPIs of a plurality of UEs; and derive the allowed list of CAG cells for the at least one UE based on the associated SUPI mapping with the revealed SUPI of the at least one UE.

In some embodiments, the CN is further configured to: determine the received at least one CAG ID of the requested at least one NPN is present in the derived allowed list of CAG cells; verify that the at least one UE has the permissions for accessing the requested at least one NPN based on the received at least one CAG ID of the requested at least one NPN being present in the derived allowed list of CAG cells; and verify that the at least one UE does not have the permissions for accessing the requested at least one CAG cell of the at least one NPN based on the received CAG ID of the requested at least one NPN not being present in the derived allowed list of CAG cells.

In some embodiments, the CN is further configured to: reject the request of the at least one UE on verifying that the at least one UE does not have the permissions for accessing the requested at least one CAG ID of the at least one NPN; and send a reject message to the at least one UE with a cause value, wherein the cause value indicates at least one cause of an error for rejecting the request of the at least one UE.

In some embodiments, the CN is further configured to: generate an authentication vector based on a received subscription permanent identifier (SUPI) of the at least one UE based on verifying that the at least one UE has the permissions for accessing the requested at least one NPN; authenticate the at least one UE based on the generated authentication vector based on determining that the at least one UE has NPN permissions to access the requested at least one NPN through the PLMN; and enable the at least one UE to access the requested at least one NPN based on the at least one UE having the NPN permissions to access the requested at least one NPN through the PLMN.

According to various embodiments, a network comprises at least one User Equipment (UE); at least one Non-Public Network (NPN); and a Public Land Mobile Network (PLMN). The at least one NPN is deployed in conjunction with the PLMN through at least one Closed Access Group (CAG) cell, the PLMN includes at least one cellular network comprising of a Radio Access Network (RAN) and a Core Network (CN), the at least one UE is configured to request the PLMN for an access to the at least one NPN, and the CN comprises a unified data management (UDM) configured to: verify permissions of the at least one UE to access the requested at least one NPN, and initiate a primary authentication procedure based on the permissions of the at least one UE to access the requested at least one NPN being verified.

In some embodiments, the at least one UE is further configured to send a request including a subscription concealed identifier (SUCI) of the at least one UE to the RAN of the PLMN requesting access to the at least one NPN, and the RAN is configured to: add a CAG Identifier (CAG ID) of the at least one NPN that is requested by the at least one UE, and send a received subscription concealed identifier (SUCI) of the UE and the CAG ID of the requested at least one NPN to the CN.

In some embodiments, the at least one UE is further configured to send the request including a subscription concealed identifier (SUCI) of the at least one UE and a CAG Identifier (CAG ID) of the requested at least one NPN to the RAN of the PLMN.

In some embodiments, the CN further comprises an access and mobility management function (AMF) and an authentication server function (AUSF), the AMF is configured to: receive the SUCI of the at least one UE and the CAG ID of the requested at least one NPN from the RAN, insert the received SUCI of the at least one UE and the CAG ID of the requested at least one NPN in a first authentication request message, and send the first authentication request message to the AUSF, and the AUSF is further configured to: derive the SUCI of the at least one UE and the CAG ID of the requested at least one NPN from the received first authentication request message, insert the derived SUCI of the at least one UE and the CAG ID of the requested at least one NPN in a first authentication get request message, and send the authentication get request message to the UDM.

In some embodiments, the UDM is further configured to: receive the SUCI of the at least one UE and the CAG ID of the requested at least one NPN from the AUSF, reveal the received SUCI of the at least one UE to a subscription permanent identifier (SUPI), map the revealed SUPI of the at least one UE with a map of an allowed list of CAG cells and the SUPIs of a plurality of UEs, retrieve the allowed list of CAG cells for the at least one UE based on the associated SUPI mapping with the revealed SUPI of the at least one UE, verify that the at least one UE has the permissions to access the requested at least one NPN based on the received CAG ID of the requested at least one NPN being present in the retrieved allowed list of CAG cells, and verify that the at least one UE does not have the permissions to access the requested at least one NPN based on the received CAG ID of the requested at least one NPN not being present in the retrieved allowed list of CAG cells.

In some embodiments, the UDM is further configured to: insert a reject message and the SUPI of the at least one UE in a second authentication get request message based on verifying that the at least one UE does not have the access to the requested at least one NPN, and send the authentication get response message to the AUSF, the AUSF is further configured to: derive the reject message from the received second authentication get response message and insert the derived reject message in a second authentication response message, and send the second authentication response message to the AMF, and the AMF is further configured to: reject the request of the at least one UE based on receiving the reject message from the AUSF; and send a reject message to the at least one UE through the RAN with a cause value, wherein the cause value indicates at least one cause of an error for rejecting the request of the at least one UE.

In some embodiments, the UDM is further configured to: generate an authentication vector based on the received SUCI of the at least one UE based on verifying the at least one UE has the permissions to access the requested at least one NPN, and send the authentication vector to the AMF through the AUSF, and the AMF is further configured to: authenticate the at least one UE based on the received authentication vector to determine based on the at least one UE having NPN permissions to access the requested at least one NPN through the PLMN; and enable the at least one UE to access the at least one requested NPN based on the at least one UE having the NPN permissions to access the requested at least one NPN through the PLMN.

According to various embodiments, a core network (CN) of a Public Land Mobile Network (PLMN), wherein the PLMN is in conjunction with at least one non-public network (NPN) and connected to at least one User Equipment (UE), wherein the CN is configured to: receive a request from the at least one UE through a Radio Access Network (RAN) for access to the at least one NPN; verify permissions of the at least one UE to access the requested at least one NPN; and perform a primary authentication procedure based on the permissions of the at least one UE to access the requested at least one NPN being verified.

In some embodiments, the request of the at least one UE includes a subscription concealed identifier (SUCI) of the at least one UE and a Closed Access Group (CAG ID) of the at least one NPN that is requested by the at least one UE.

In some embodiments, the CN is further configured to: reveal a received subscription concealed identifier (SUCI) of the at least one UE to a subscription permanent identifier (SUPI), map the revealed SUPI of the at least one UE with a map of an allowed list of CAG cells and the SUPIs of a plurality of UEs, retrieve the allowed list of CAG cells for the at least one UE based on the associated SUPI mapping with the revealed SUPI of the at least one UE, verify that the at least one UE has the permissions to access the requested at least one NPN based on receiving a Closed Access Group Identifier (CAG ID) of the requested at least one NPN being present in the retrieved allowed list of CAG cells, and verify that the at least one UE does not have the permissions to access the requested at least one NPN based on the received CAG ID of the requested at least one NPN not being present in the retrieved allowed list of CAG cells.

In some embodiments, the CN is further configured to: reject the request of the at least one UE based on verifying that the at least one UE does not have the permissions to access the requested at least one NPN, and send a reject message to the at least one UE through the RAN with a cause value, wherein the cause value indicating at least one cause of an error for rejecting the request of the at least one UE.

Figure 4:
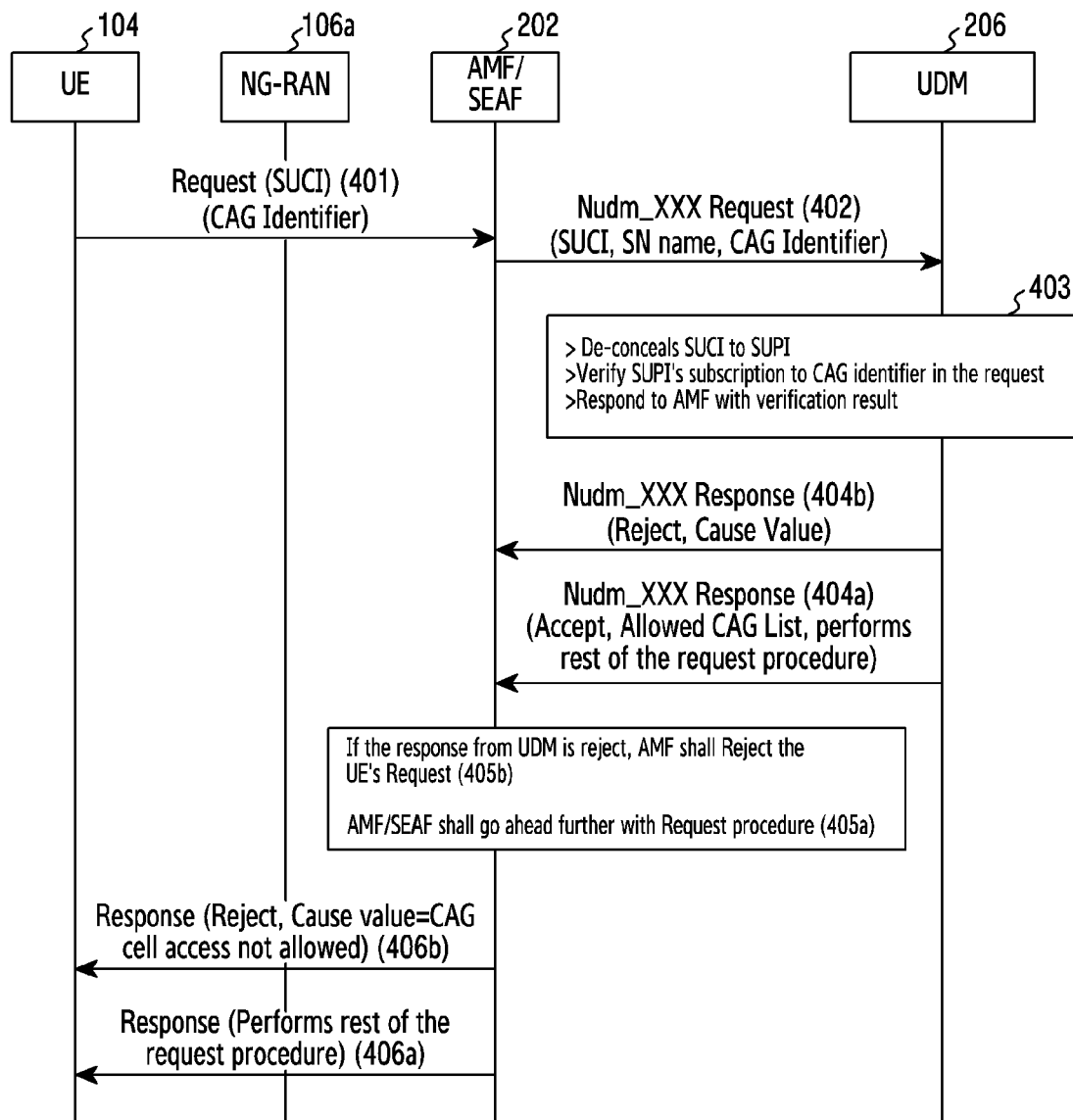
FIG. 4 is a sequence diagram depicting the verification of the permissions of the UE to access the CAG cell at the UDM of the 5GC by directly communicating with the AMF/SEAF, according to embodiments as disclosed herein.

FIG. 4 is a sequence diagram depicting the verification of the permissions of the UE 104 to access the CAG cell at the UDM 206 of the 5GC 108a by directly communicating with the AMF/SEAF 202, according to embodiments as disclosed herein. At step 401, the UE 104 sends the registration request including the SUCI to the AMF/SEAF 202 through the NG-RAN 106a for accessing the CAG cell/NPN 102b. The NG-RAN 106a may also send the CAG ID of the requested CAG cell/NPN 102b to the AMF/SEAF 202 or the UE 104 may send the CAG ID of the requested CAG cell/NPN 102b to the AMF/SEAF 202 through the NG-RAN 106a.

At step 402, the AMF/SEAF 202 inserts the received SUCI of the UE 104, the CAG ID, and the other parameters (like SN name) in the Nudm_XXX request message and sends the Nudm_XXX request message to the UDM 206.

At step 403, the UDM 206 verifies the permissions of the UE 104 to access the requested CAG cell/NPN 102b on receiving the authentication get request message from the AMF/SEAF 202. In an embodiment, the UDM 206 verifies the permissions of the UE 104 to access the requested CAG cell/NPN 102b before performing the primary authentication procedure. The UDM 206 reveals the received SUCI to the SUPI and retrieves the allowed list of CAG cells based on the SUPI. The UDM 206 verifies if the UE 104 has the permissions to access the requested CAG cell/NPN 102b based on the allowed list of CAG cells retrieved based on the SUPI of the UE 104, and the CAG ID of the requested CAG cell. On verifying that the UE 104 has permissions to the requested CAG cell, the UDM 206 inserts the accept message, the allowed list of CAG cells for the UE 104, or the like in the Nudm_XXX response message. At step 404a, the UDM 206 sends the Nudm_XXX response message to the AMF/SEAF 202 indicating the successful verification. At step 405a, on receiving the Nudm_XXX response message, the AMF/SEAF 202 proceeds further with the registration request of the UE 104. At step 406a, the AMF/SEAF 202 performs the primary authentication procedure (as specified in 3GPP TS 33.501) for authenticating the UE 104 in order to allow the UE 104 to access the NPN 102b/services provided by the NPN 102b.

On verifying that the UE 104 does not have the permissions to access the CAG cell/NPN 102b, the UDM 206 includes the reject message indicating that the UE 104 is not permitted to use the CAG cell and the cause value in the Nudm_XXX response message. At step 404b, the UDM 206 sends the Nudm_XXX response message to the AMF/SEAF 202 indicating the unsuccessful verification. At step 405b, the AMF/SEAF 202 rejects the registration request of the UE 104. At step 406b, the AMF/SEAF 202 sends the response with the reject message and the appropriate cause value to the UE 104.

Figure 5:
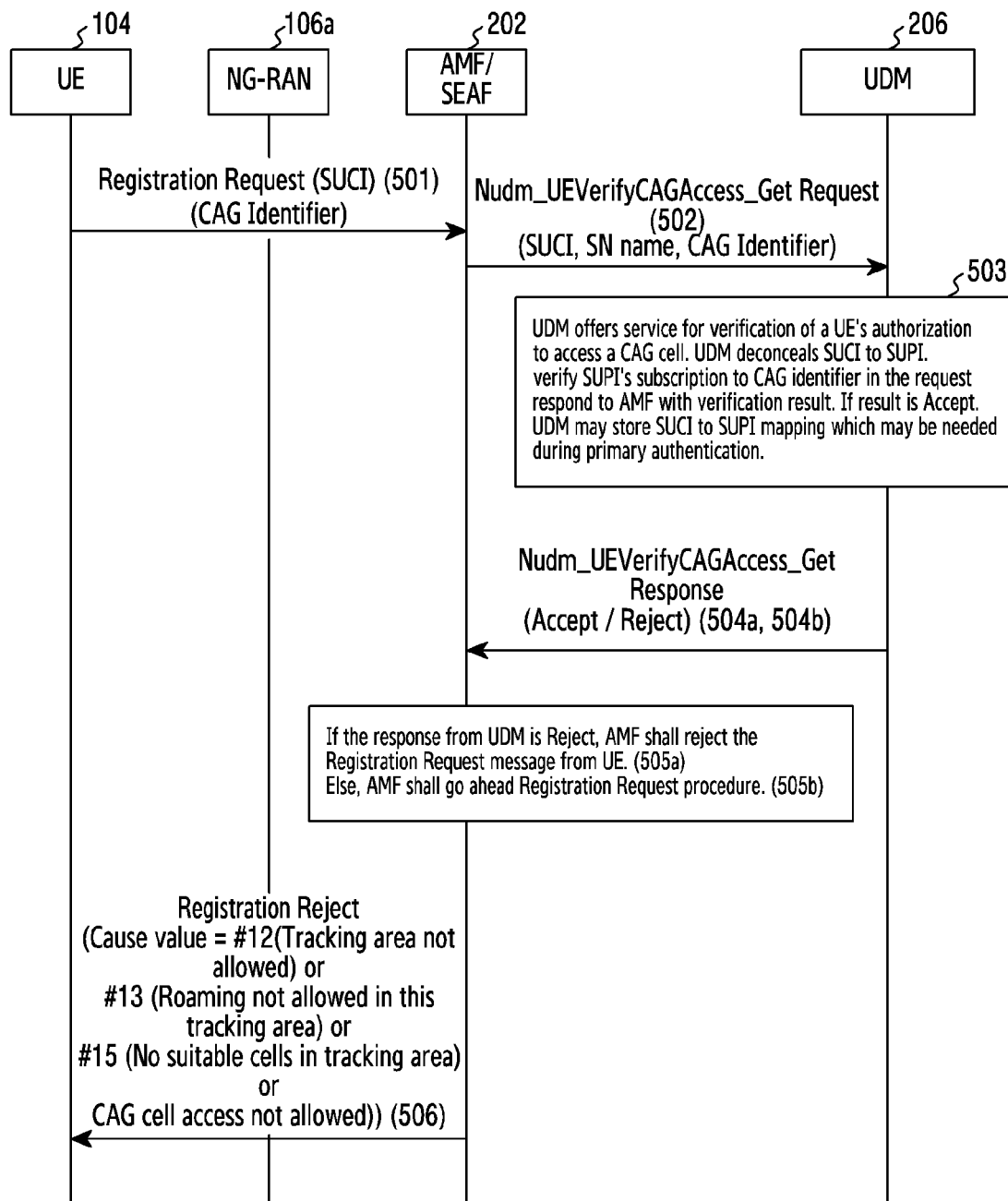
FIG. 5 is a sequence diagram depicting the verification of the permissions of the UE to access the CAG cell at the UDM by communicating with the AMF/SEAF over get request message and get response messages, according to embodiments as disclosed herein.

FIG. 5 is a sequence diagram depicting the verification of the permissions of the UE 104 to access the CAG cell at the UDM 206 by communicating with the AMF/SEAF 202 over get request message and get response messages, according to embodiments as disclosed herein. At step 501, the UE 104 sends the registration request including the SUCI to the AMF/SEAF 202 through the NG-RAN 106a for accessing the CAG cell/NPN 102b. The NG-RAN 106a may also send the CAG ID of the requested CAG cell/NPN 102b to the AMF/SEAF 202 or the UE 104 may send the CAG ID of the requested CAG cell/NPN 102b to the AMF/SEAF 202 through the NG-RAN 106a.

At step 502, the AMF/SEAF 202 inserts the received SUCI of the UE 104, the CAG ID, and the other parameters (like SN name) in the Nudm_UEVerifyCAGAccess_Get request message and sends the Nudm_UEVerifyCAGAccess_Get request message to the UDM 206.

At step 503, the UDM 206 verifies the permissions of the UE 104 to access the requested CAG cell/NPN 102b on receiving the authentication get request message from the AMF/SEAF 202. In an embodiment, the UDM 206 verifies the permissions of the UE 104 to access the requested CAG cell/NPN 102b before performing the primary authentication procedure. The UDM 206 reveals the received SUCI to the SUPI and retrieves the allowed list of CAG cells based on the SUPI. The UDM 206 verifies if the UE 104 has the permissions to access the requested CAG cell/NPN 102b based on the allowed list of CAG cells retrieved based on the SUPI of the UE 104, and the CAG ID of the requested CAG cell. On verifying that the UE 104 has permissions to the requested CAG cell, the UDM 206 inserts the accept message, the allowed list of CAG cells for the UE 104, or the like in the Nudm_UEVerifyCAGAccess_Get Response message. At step 504a, the UDM 206 sends the Nudm_UEVerifyCAGAccess_Get Response message to the AMF/SEAF 202 indicating the successful verification. At step 505a, on receiving the Nudm_XXX response message, the AMF/SEAF 202 proceeds further with the registration request of the UE 104.

On verifying that the UE 104 does not have the permissions to access the CAG cell/NPN 102b, the UDM 206 includes the reject message indicating that the CAG cell is not allowed for the UE 104 and the cause value in the Nudm_XXX response message. At step 504*b*, the UDM 206 sends the Nudm_XXX response message to the AMF/SEAF 202 indicating the unsuccessful verification. At step 505*b*, the AMF/SEAF 202 rejects the registration request of the UE 104. At step 506, the AMF/SEAF 202 sends the response with the reject message and the appropriate cause value to the UE 104.

Figure 6:
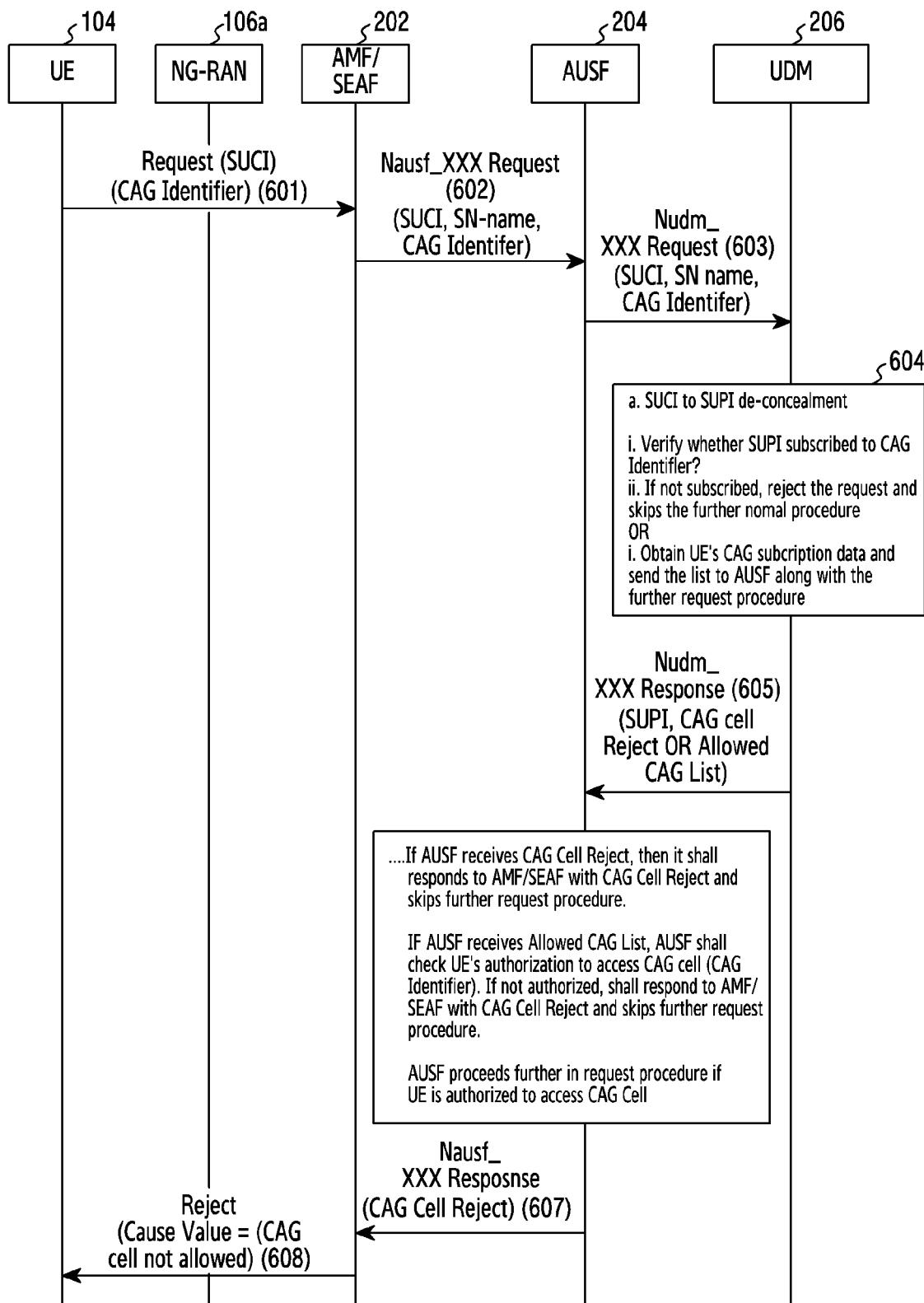
FIG. 6 is a sequence diagram depicting verification of the permissions of the UE to access the CAG cell at the UDM 206 and/or the AUSF of the 5GC, according to embodiments as disclosed herein.

FIG. 6 is a sequence diagram depicting verification of the permissions of the UE to access the CAG cell at the UDM 206 and/or the AUSF 204 of the 5GC 108*a*, according to embodiments as disclosed herein. At step 601, the UE 104 sends the registration request to the AMF/SEAF 202 through the NG-RAN 106*a* to access the CAG cell/NPN 102*b*. The registration request includes the SUCI of the UE 104. In an embodiment, the UE 104 may also send the CAG ID of the requested CAG cell/NPN 102*b* in the registration request to the AMF/SEAF 202 through the NG-RAN 106*a*. In an embodiment, the NG-RAN 106*a* may send the CAG ID of the requested CAG cell/NPN 102*b* along with the registration request to the AMF/SEAF 202.

At step 602, the AMF/SEAF 202 inserts the received SUCI of the UE 104, the CAG ID, and the other parameters in the Nausf_XXX request message and sends the Nausf_XXX request message to the AUSF 204. At step 603, the AUSF 204 inserts the SUCI, the CAG ID, and the other parameters of the received Nausf_XXX message in the Nudm_XXX request message. The AUSF 204 sends the Nudm_XXX request message to the UDM 206.

At step 604, the UDM 206 reveals the received SUCI to the SUPI and retrieves the allowed list of CAG cells for the UE 104 based on the SUPI. In an embodiment, the UDM 206 verifies the permissions of the UE 104 to access the requested CAG cell/NPN 102*b* using the allowed list of CAG cells for the UE 104 retrieved based on the SUPI and the received CAG ID of the requested CAG cell/NPN 102*b*. On verifying that that the UE has the permissions to access the CAG cell/NPN 102*b*, the UDM 206 initiates the primary authentication procedure (as specified in 3GPP TS 33.501) for authenticating the UE 104 in order to allow the UE 104 to access the NPN 102*b*/services provided by the NPN 102*b*. On verifying that the UE 104 does not have the permissions to access the CAG cell/NPN 102*b*, the UDM 206 includes the CAG cell reject message indicating that the CAG cell is not allowed for the UE 104 and the SUPI of the UE in the Nudm_XXX response message. At step 605, the UDM 206 sends the Nudm_XXX response message indicating that the CAG cell is not allowed to the AUSF 204.

In an embodiment, the UDM 206 may send the retrieved allowed list of CAG cells to the AUSF 204 for performing the verification of the permissions of the UE 104. In such a case, at step 605, the UDM 206 sends the Nudm_XXX response message including the allowed list of CAG cells to the AUSF 204.

At step 606, the AUSF 204 verifies the permissions of the UE 104 to access the CAG cells/NPN 102*b* using the received allowed list of CAG cells and the CAG ID of the requested CAG cell/NPN 102*b*.

At step 607, the AUSF 204 sends the CAG cell reject in the Nausf_XXX response message to the AMF/SEAF 202 on verifying that the UE 104 does not have the permissions to access the CAG cell or receiving the Nudm_XXX response indicating that the CAG cell access is not allowed from the UDM 206. At step 608, the AMF/SEAF 202 rejects the registration request of the UE 104 by sending the reject message and the appropriate cause value to the UE 104.

Figure 7:
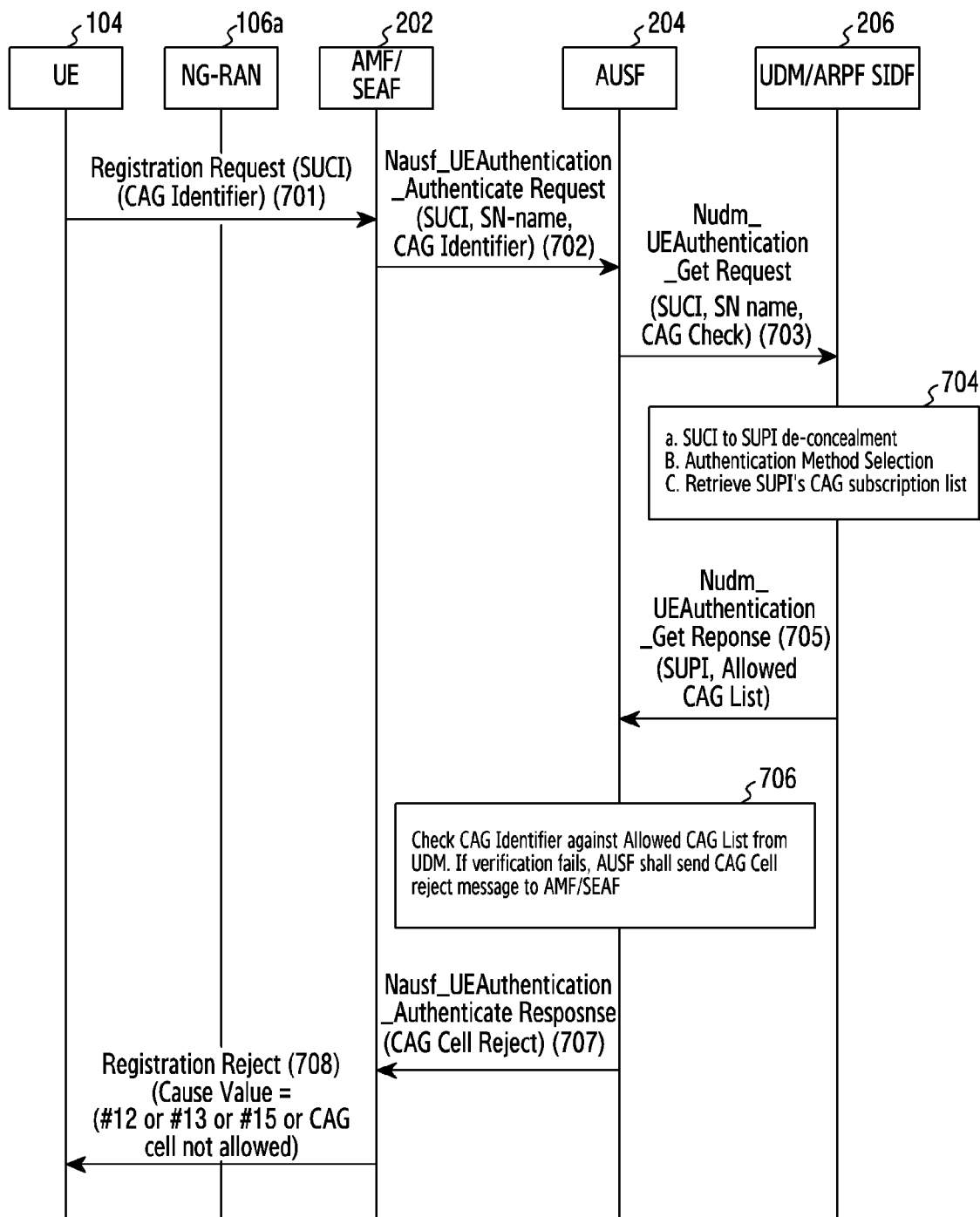
FIG. 7 is a sequence diagram depicting verification of the permissions of the UE to access the CAG cell at the AUSF of the 5GC, according to embodiments as disclosed herein.

FIG. 7 is a sequence diagram depicting verification of the permissions of the UE 104 to access the CAG cell at the AUSF 204 of the 5GC 108*a*, according to embodiments as disclosed herein. At step 701, the UE 104 sends the registration request to the AMF/SEAF 202 through the NG-RAN 106*a* to access the CAG cell/NPN 102*b*. The registration request includes the SUCI of the UE 104. In an embodiment, the UE 104 may also send the CAG ID of the requested CAG cell/NPN 102*b* in the registration request to the AMF/SEAF through the NG-RAN 106*a*. In an embodiment, the NG-RAN may send the CAG ID of the requested CAG cell/NPN 102*b* along with the registration request to the AMF/SEAF 202.

At step 702, the AMF/SEAF 202 inserts the received SUCI of the UE 104, the CAG ID, and the other parameters in the Nausf_UEAuthentication_Authenticate Request message and sends the Nausf_UEAuthentication_Authenticate Request message to the AUSF 204. At step 703, the AUSF 204 inserts the SUCI, the CAG ID, and the other parameters of the received Nausf_UEAuthentication_Authenticate Request in the Nudm_UEAuthentication_Get Request message. The AUSF 204 sends the Nudm_UEAuthentication_Get Request message to the UDM 206.

At step 704, the UDM 206 reveals the received SUCI to the SUPI and retrieves the allowed list of CAG cells for the UE 104 based on the SUPI. At step 705, the UDM 206 inserts the SUPI of the UE 104 and the allowed list of CAG cells in the Nudm_UE authentication_Get Response and sends the Nudm_UE_authentication_Get Response to the AUSF 204.

At step 706, the AUSF 204 verifies the permissions of the UE 104 to access the requested CAG cell/NPN 102*b* using the received allowed list of CAG cells for the UE 104 and the received CAG ID of the requested CAG cell/NPN 102*b*. On verifying that the UE 104 has the permissions to access the CAG cell/NPN 102*b*, the AUSF 204 initiates the primary authentication procedure (as specified in 3GPP TS 33.501) for authenticating the UE 104 in order to allow the UE 104 to access the NPN 102*b*/services provided by the NPN 102*b*. On verifying that the UE 104 does not have the permissions to access the CAG cell/NPN 102*b*, the AUSF 204 includes the CAG cell reject message indicating that the CAG cell is not allowed for the UE 104 in the Nausf_UEAuthentication_Authenticate Response message. At step 707, the AUSF 204 sends the Nausf_UEAuthentication_Authenticate Response message to the AMF/SEAF 202 indicating that the CAG cell is not allowed.

At step 708, the AMF/SEAF 202 rejects the registration request of the UE 104 by sending the reject message and the appropriate cause value to the UE 104.

Figure 8:
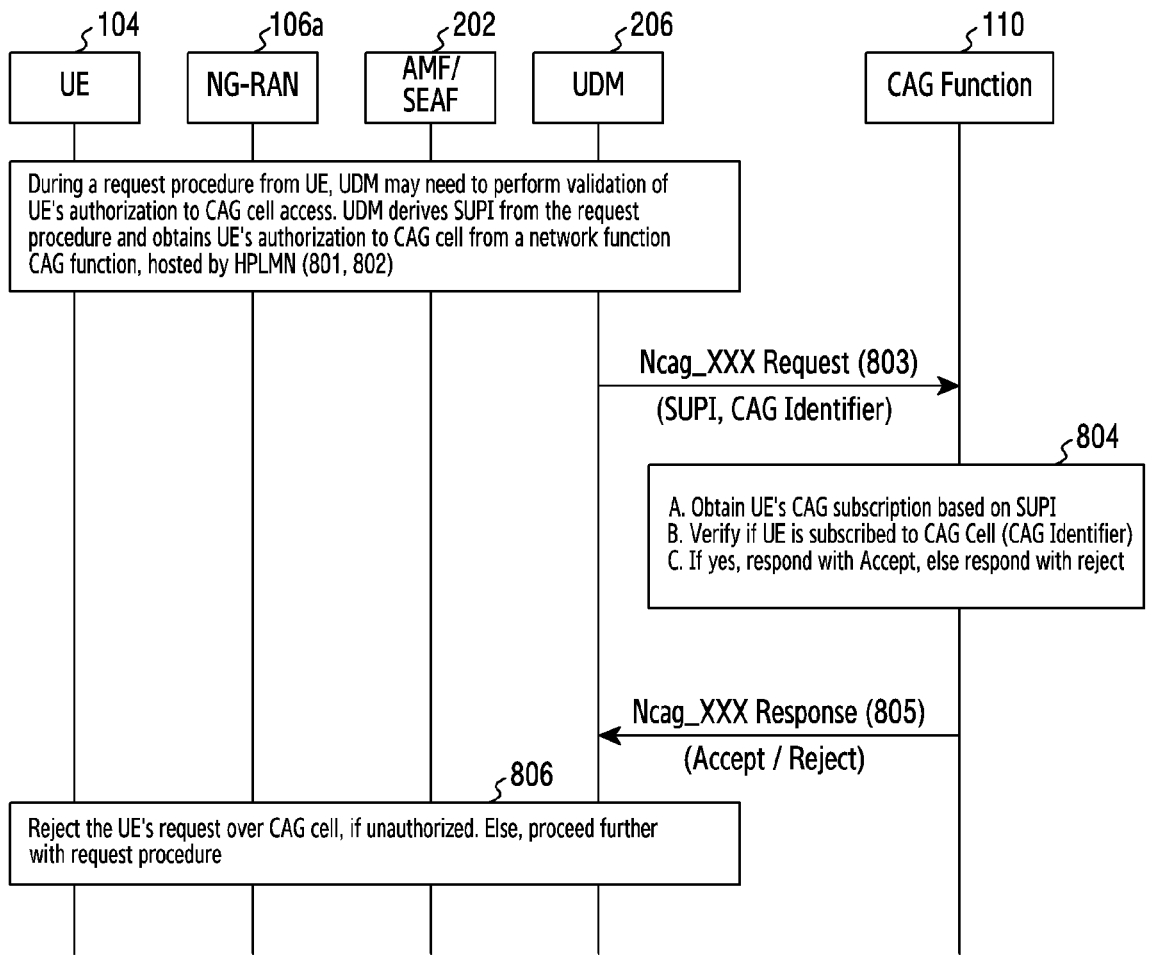
FIG. 8 is a sequence diagram depicting verification of the permissions of the UE to access the CAG cell at the CAG server on receiving the request from the UDM, according to embodiments as disclosed herein.

FIG. 8 is a sequence diagram depicting verification of the permissions of the UE 104 to access the CAG cell at the CAG server 110 on receiving the request from the UDM 206, according to embodiments as disclosed herein. At step 801, the UDM 206 receives the registration request of the UE 104 requesting the access to the CAG cell/NPN 102*b*, wherein the registration request includes the SUCI of the UE 104 and the CAG ID of the requested CAG cell/NPN 102*b*. The UDM 206 derives the SUPI of the UE 104 from the received SUCI. At step 802, the UDM 206 inserts the SUPI of the UE 104 and the CAG ID of the requested CAG cell/NPN 102*b* in the Ncag_XXX Request message. At step 803, the UDM 206 sends the Ncag_XXX Request message to the CAG server 110.

At step 804, the CAG server 110 obtains the allowed list of CAG cells for the UE 104 based on the received SUPI of the UE 104 from the UDM 206. The CAG server 110 verifies the permissions of the UE 104 to access the CAG cell/NPN 102*b* based on the allowed list of CAG cells and the CAG ID of the requested CAG cell. On verifying that the UE 104 has the permissions to verify the requested CAG cell/NPN 102b, the CAG server 110 inserts the accept message in the Ncag_XXX Response message. At step 805, the CAG server 110 sends the Ncag-XXX Response message including the accept message to the UDM 206. At step 806, the UDM 206 may proceed further with the request procedure.

On verifying that the UE 104 does not have the permissions to verify the requested CAG cell/NPN 102b, the CAG server inserts the reject message in the Ncag_XXX Response message. At step 805, the CAG server 110 sends the Ncag-XXX Response message including the reject message to the UDM 206 indicating that the CAG cell access is not allowed. At step 806, the UDM 206 may reject the registration request of the UE 104 with the appropriate cause value.

Figure 9:
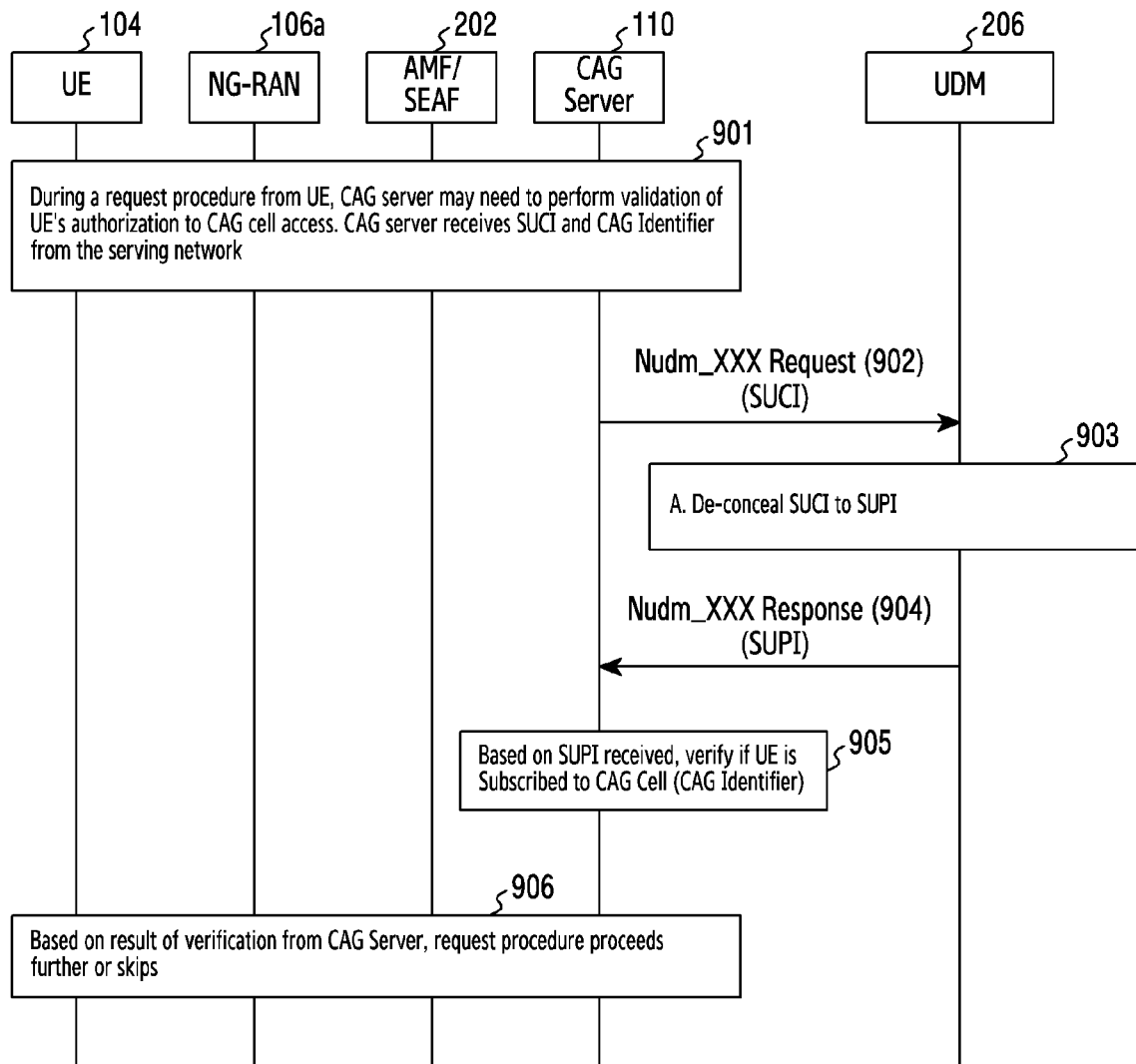
FIG. 9 is a sequence diagram depicting verification of the permissions of the UE to access the CAG cell at the CAG server on receiving the SUCI of the UE from the AMF/SEAF, according to embodiments as disclosed herein.

FIG. 9 is a sequence diagram depicting verification of the permissions of the UE 104 to access the CAG cell at the CAG server 110 on receiving the SUCI of the UE 104 from the AMF/SEAF 202, according to embodiments as disclosed herein. At step 901, the UE 104 sends the registration request to the AMF/SEAF 202 through the NG-RAN 106a to access the CAG cell/NPN 102b. The registration request includes the SUCI of the UE 104. In an embodiment, the UE 104 may also send the CAG ID of the requested CAG cell/NPN 102b in the registration request to the AMF/SEAF 202 through the NG-RAN 106a. In an embodiment, the NG-RAN 106a may send the CAG ID of the requested CAG cell/NPN 102b along with the registration request to the AMF/SEAF 202. The AMF/SEAF 202 sends the received SUCI of the UE 104 and the CAG ID of the requested CAG cell/NPN 102b to the CAG server 110.

At step 902, the CAG server 110 inserts the received SUCI in the Nudm_XXX request message and sends the Nudm_XXX request message to the UDM 206. At step 903, the UDM 206 reveals the SUCI to the SUPI. At step 904, the UDM 206 sends the revealed SUPI to the CAG server 110 over the Nudm_XXX response message.

At step 905, the CAG server 110 obtains the allowed list of CAG cells for the UE 104 based on the received SUPI of the UE 104 from the UDM 206. The CAG server 110 verifies the permissions of the UE 104 to access the CAG cell/NPN 102b based on the allowed list of CAG cells and the CAG ID of the requested CAG cell. At step 906, the CAG server 110 sends the results (accept and/or reject) of the verification to the AMF/SEAF 202. The AMF/SEAF 202 proceeds further with the registration request of the UE 104 if the result of the verification is accepted or the AMF/SEAF 202 rejects the registration request of the UE 104 if the result of the verification is rejected.

Figure 10:
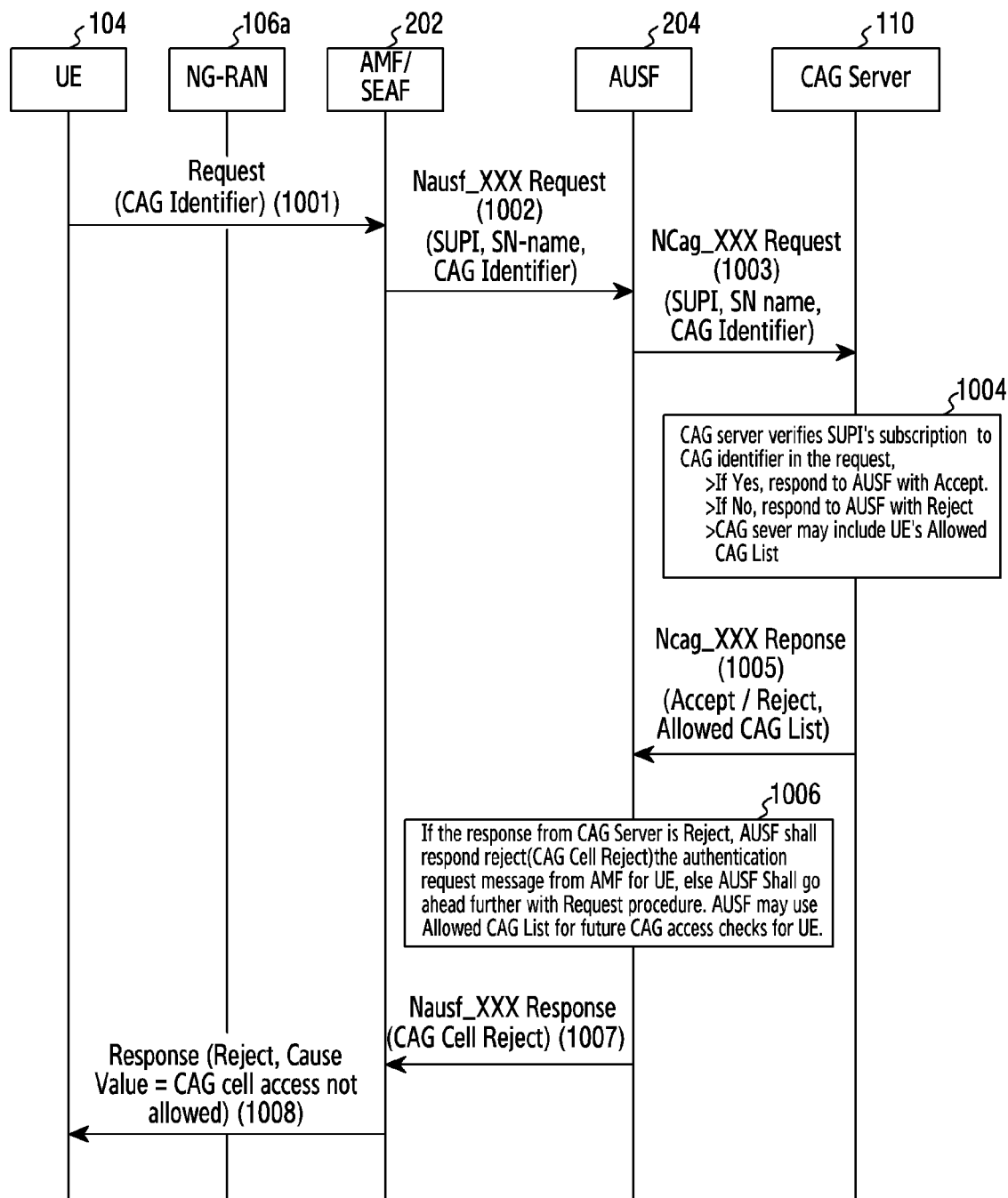
FIG. 10 is a sequence diagram depicting verification of the permissions of the UE to access the CAG cell at the CAG server on receiving the SUCI of the UE from the AUSF, according to embodiments as disclosed herein.

FIG. 10 is a sequence diagram depicting verification of the permissions of the UE 104 to access the CAG cell at the CAG server 110 on receiving the SUCI of the UE 104 from the AUSF 204, according to embodiments as disclosed herein. At step 1001, the UE 104 sends the service request to the AMF/SEAF 202 through the NG-RAN 106a requesting the access for the CAG cell/NPN 102b. In an embodiment, the UE 104 may also send the CAG ID of the requested CAG cell/NPN 102b in the registration request to the AMF/SEAF 202 through the NG-RAN 106a. In an embodiment, the NG-RAN 106a may send the CAG ID of the requested CAG cell/NPN 102b along with the registration request to the AMF/SEAF 202.

At step 1002, the AMF/SEAF 202 inserts the SUPI of the UE 104, the CAG ID of the requested CAG cell, and the other parameters (like SN name) in the Nausf_XXX Request message and sends the Nausf_XXX Request message to the AUSF 204.

At step 1003, the AUSF 204 derives the SUPI of the UE 104, the CAG ID of the requested CAG cell, and the other parameters (like SN name) from the received Nausf_XXX Request message. The AUSF 204 inserts the SUPI of the UE 104, the CAG ID of the requested CAG cell, and the other parameters (like SN name) in the NCag_XXX Request message and sends the NCag_XXX Request message to the CAG server 110.

At step 1004, the CAG server 110 verifies the permissions of the UE 104 to access the requested CAG cell/NPN 102b on receiving the NCag_XXX Request message from the AUSF 204. In an embodiment, the CAG server 110 verifies the permissions of the UE 104 to access the requested CAG cell/NPN. The CAG server 110 retrieves the allowed list of CAG cells based on the received SUPI. The CAG server 110 verifies if the UE 104 has the permissions to access the requested CAG cell/NPN 102b based on the allowed list of CAG cells retrieved based on the SUPI of the UE 104, and the CAG ID of the requested CAG cell. On verifying that the UE 104 has permissions to the requested CAG cell, the CAG server 110 inserts the accept message, the allowed list of CAG cells for the UE 104, or the like in the NCag_XXX Response message. At step 1005, the CAG server 110 sends the NCag_XXX Response message to the AUSF 204 indicating the successful verification. At step 1006, the AUSF 204 may proceed further with the registration request of the UE 104 on receiving the accept message from the CAG server 110.

On verifying that the UE 104 does not have the permissions to access the CAG cell/NPN 102b, the CAG server 110 inserts the reject message in the NCag_XXX Response message. At step 1005, the CAG server 110 sends the NCag_XXX Response message including the reject message to the AUSF 204 indicating that the CAG cell is not allowed for the UE 104.

At step 1006, the AUSF 204 rejects the service request of the UE 104 on receiving the reject message from the CAG server 110. At step 1007, the AUSF 204 sends the Nausf_XXX Response message including the CAG cell reject to the AMF/SEAF 202 on receiving the reject message from the CAG server 110.

At step 1008, the AMF/SEAF 202 rejects the registration request of the UE 104 by sending the reject message and the appropriate cause value to the UE 104 on receiving the reject message from the AUSF 204.

Figure 11:
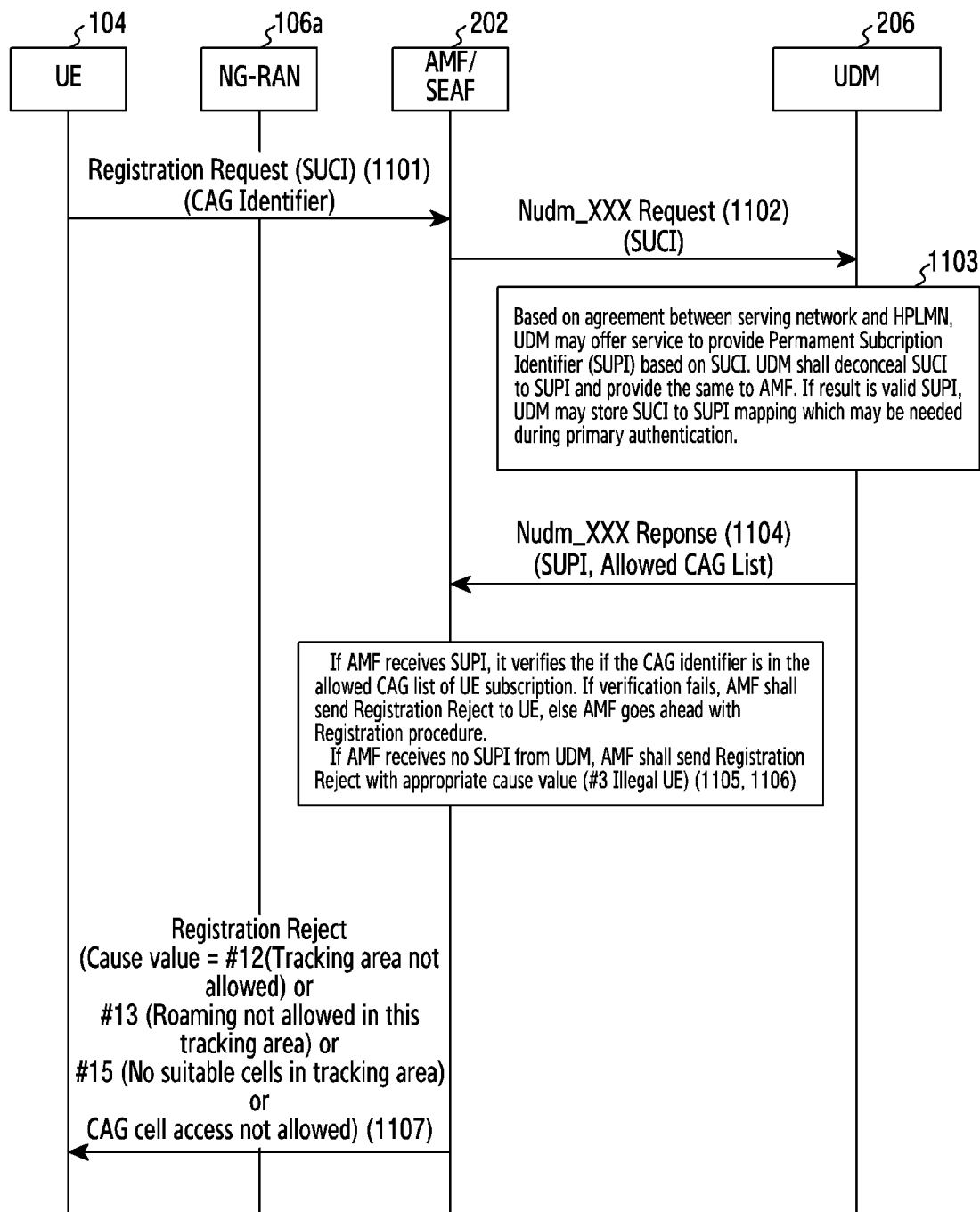
FIG. 11 is a sequence diagram depicting verification of the permissions of the UE to access the CAG cell at the AMF/SEAF, according to embodiments as disclosed herein.

FIG. 11 is a sequence diagram depicting verification of the permissions of the UE to access the CAG cell at the AMF/SEAF 202, according to embodiments as disclosed herein. At step 1101, the UE 104 sends the registration request to the AMF/SEAF 202 through the NG-RAN 106a requesting the access for the CAG cell/NPN 102b. The registration request includes the SUCI of the UE 104. In an embodiment, the UE 104 may also send the CAG ID of the requested CAG cell/NPN 102b in the registration request to the AMF/SEAF 202 through the NG-RAN 106a. In an embodiment, the NG-RAN 106a may send the CAG ID of the requested CAG cell/NPN 102b along with the registration request to the AMF/SEAF 202.

At step 1102, the AMF/SEAF 202 inserts the received SUCI of the UE 104 in the Nudm_XXX Request message and sends the Nudm_XXX Request message to the UDM 206.

At step 1103, the UDM 206 reveals the received SUCI of the UE 104 to the SUPI and retrieves the allowed list of CAG cells for the UE 104 based on the SUPI. If the revealed SUPI is valid, the UDM 206 stores the SUCI to the SUPI mapping, which may be used during the primary authentication procedure. At step 1104, the UDM 206 sends the SUPI and the allowed list of CAG cells for the UE 104 to the AMF/SEAF 202 over the Nudm_XXX Response message.

At step 1105, the AMF/SEAF 202 verifies the permissions of the UE 104 to access the requested CAG cell/NPN 102*b* based on the received allowed list of CAG cells and the CAG ID of the requested CAG cell/NPN 102*b*.

At step 1106, the AMF/SEAF 202 proceeds further with the registration request of the UE 104 on verifying that the UE has the permissions to access the CAG cells.

At step 1107, the AMF/SEAF 202 rejects the registration request of the UE 104 by sending the reject message with the appropriate cause value to the UE 104 on verifying that the UE 104 does not have the permissions to access the CAG cells.

Figure 12:
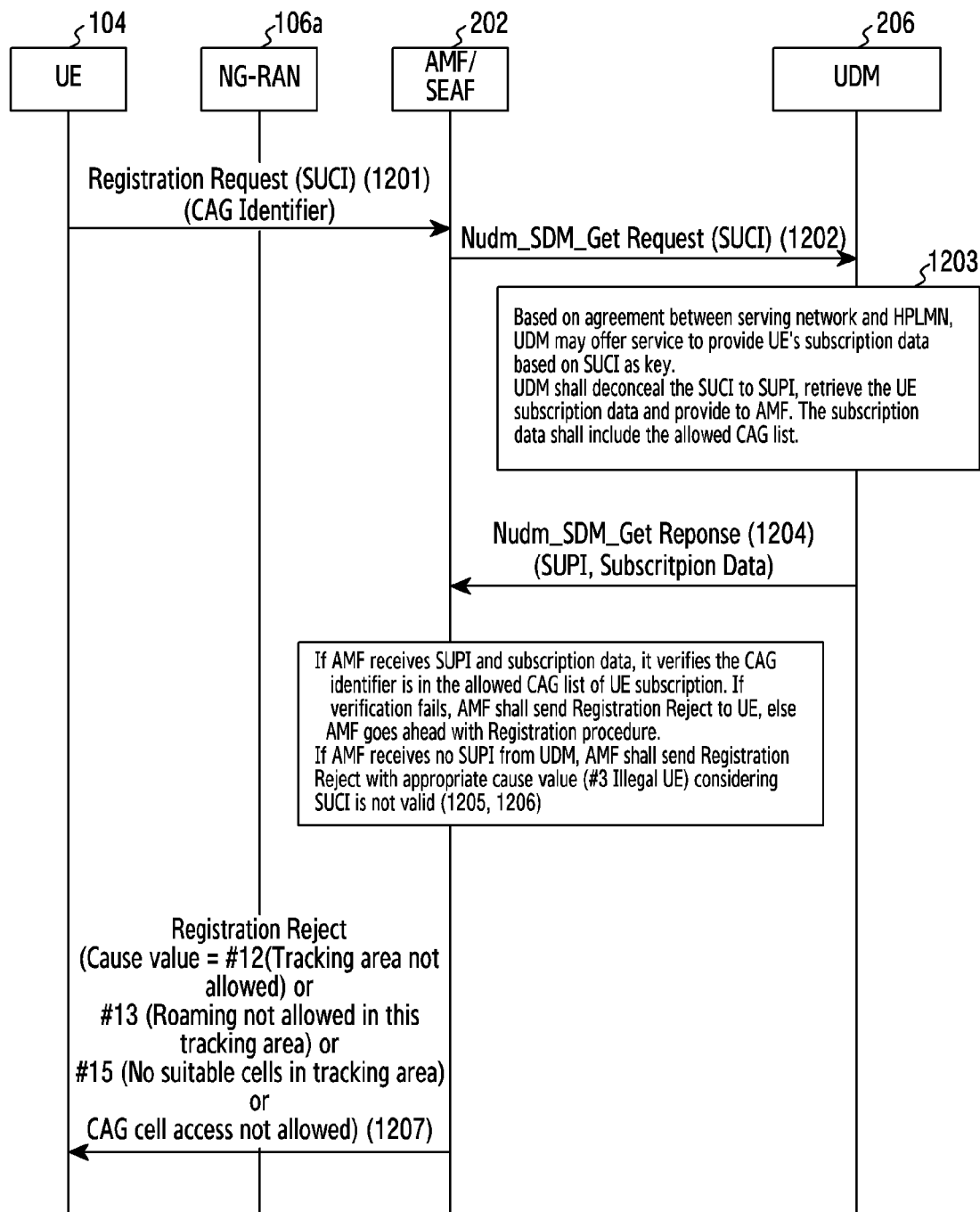
FIG. 12 is a sequence diagram depicting verification of the permissions of the UE to access the CAG cell at the AMF/SEAF by communicating with the UDM over the service interface provided by the UDM, according to embodiments as disclosed herein.

FIG. 12 is a sequence diagram depicting verification of the permissions of the UE to access the CAG cell at the AMF/SEAF 202 by communicating with the UDM 206 over the service interface provided by the UDM 206, according to embodiments as disclosed herein. At step 1201, the UE 104 sends the registration request to the AMF/SEAF 202 through the NG-RAN 106*a* requesting the access for the CAG cell/NPN 102*b*. The registration request includes the SUCI of the UE 104. In an embodiment, the UE 104 may also send the CAG ID of the requested CAG cell/NPN 102*b* in the registration request to the AMF/SEAF 202 through the NG-RAN 106*a*. In an embodiment, the NG-RAN 106*a* may send the CAG ID of the requested CAG cell/NPN 102*b* along with the registration request to the AMF/SEAF 202.

At step 1202, the AMF/SEAF 202 inserts the received SUCI of the UE 104 in the Nudm_SDM_Get Request message and sends the Nudm_SDM_Get Request message to the UDM 206.

At step 1203, the UDM 206 reveals the received SUCI of the UE 104 to the SUPI and retrieves the allowed list of CAG cells for the UE 104 based on the SUPI. If the revealed SUPI is valid, the UDM 206 stores the SUCI to the SUPI mapping, which may be used during the primary authentication procedure. At step 1204, the UDM sends the SUPI and the allowed list of CAG cells for the UE 104 to the AMF/SEAF 202 over the Nudm_SDM_Get Response message.

At step 1205, the AMF/SEAF 202 verifies the permissions of the UE 104 to access the requested CAG cell/NPN 102*b* based on the received allowed list of CAG cells and the CAG ID of the requested CAG cell/NPN 102*b*.

At step 1206, the AMF/SEAF 202 proceeds further with the registration request of the UE 104 on verifying that the UE has the permissions to access the CAG cells.

At step 1207, the AMF/SEAF 202 rejects the registration request of the UE 104 by sending the reject message with the appropriate cause value to the UE 104 on verifying that the UE 104 does not have the permission to access the CAG cells or if the AMF/SEAF 202 does not receive the SUPI from the UDM 206.

Figure 13:
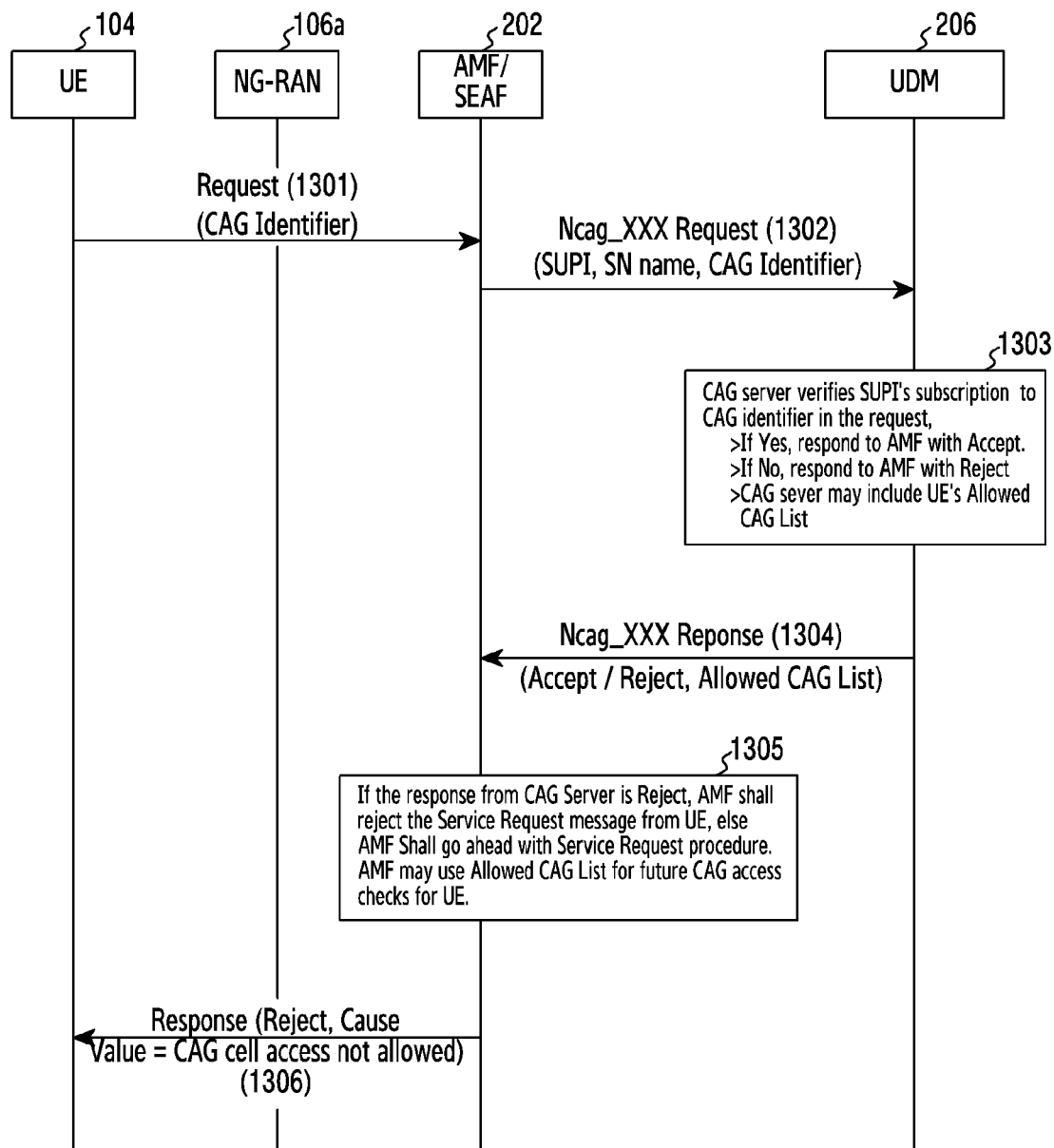
FIG. 13 is a sequence diagram depicting verification of the permissions of the UE to access the CAG cell at the CAG server by communicating directly with the AMF/SEAF, according to embodiments as disclosed herein.

FIG. 13 is a sequence diagram depicting verification of the permissions of the UE to access the CAG cell at the CAG server by communicating directly with the AMF/SEAF 202, according to embodiments as disclosed herein. At step 1301, the UE 104 sends the service request to the AMF/SEAF 202 through the NG-RAN 106*a* requesting the access for the CAG cell/NPN 102*b*. In an embodiment, the UE 104 may also send the CAG ID of the requested CAG cell/NPN 102*b* in the request message to the AMF/SEAF 202 through the NG-RAN 106*a*. In an embodiment, the NG-RAN 106*a* may send the CAG ID of the requested CAG cell/NPN 102*b* along with the registration request to the AMF/SEAF 202.

At step 1302, the AMF/SEAF 202 reveals the SUPI of the UE 104. The AMF/SEAF 202 inserts the revealed SUPI of the UE 104, the CAG ID of the requested CAG cell/NPN 102*b* in the Nudm_XXX Request message and sends the Nudm_XXX Request message to the CAG server 110.

At step 1303, the CAG server 110 retrieves the allowed list of CAG cells based on the received SUPI. The CAG server 110 verifies if the UE 104 has the permissions to access the requested CAG cell/NPN 102*b* based on the allowed list of CAG cells retrieved based on the SUPI of the UE 104, and the CAG ID of the requested CAG cell. On verifying that the UE 104 has the permissions to the requested CAG cell, the CAG server 110 inserts the accept message, and the allowed list of CAG cells for the UE 104 in the NCag_XXX Response message. At step 1304, the CAG server 110 sends the NCag_XXX Response message to the AMF/SEAF 202 indicating the successful verification. At step 1305, the AMF/SEAF 202 may proceed further with the registration request of the UE 104 on receiving the accept message from the CAG server.

On verifying that the UE 104 does not have the permissions to access the CAG cell/NPN 102*b*, the CAG server 110 inserts the reject message in the NCag_XXX Response message. At step 1304, the CAG server 110 sends the NCag_XXX Response message including the reject message to the AMF/SEAF indicating that the CAG cell is not allowed for the UE 104.

At step 1305, the AMF/SEAF 202 rejects the service request of the UE 104 on receiving the reject message from the CAG server 110. At step 1306, the AMF/SEAF 202 sends the reject message and the appropriate cause value to the UE 104.

Figure 14:
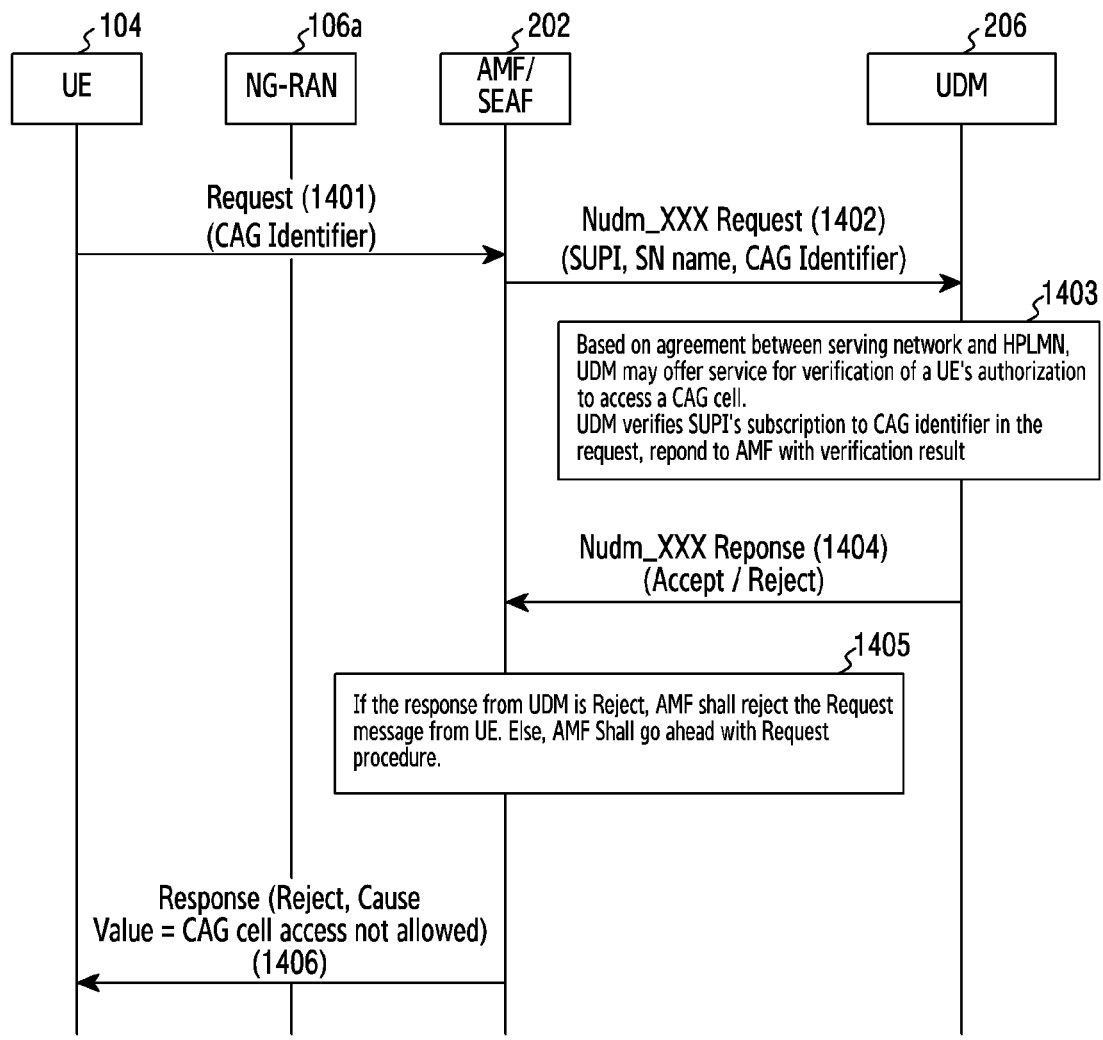
FIG. 14 is a sequence diagram depicting verification of the permissions of the UE to access the CAG cell at the UDM on receiving the SUPI of the UE from the AMF/SEAF, according to embodiments as disclosed herein.

FIG. 14 is a sequence diagram depicting verification of the permissions of the UE to access the CAG cell at the UDM 206 on receiving the SUPI of the UE 104 from the AMF/SEAF, according to embodiments as disclosed herein. At step 1401, the UE 104 sends the service request to the AMF/SEAF 202 through the NG-RAN 106*a* requesting the access for the CAG cell/NPN 102*b*. In an embodiment, the UE 104 may also send the CAG ID of the requested CAG cell/NPN 102*b* in the service request to the AMF/SEAF 202 through the NG-RAN 106*a*. In an embodiment, the NG-RAN 106*a* may send the CAG ID of the requested CAG cell/NPN 102*b* along with the registration request to the AMF/SEAF 202.

At step 1402, the AMF/SEAF 202 reveals the SUPI of the UE 104. The AMF/SEAF 202 inserts the revealed SUPI of the UE 104, the CAG ID of the requested CAG cell/NPN 102*b* in the Nudm_XXX Request message and sends the Nudm_XXX Request message to the UDM 206.

At step 1403, the UDM 206 retrieves the allowed list of CAG cells based on the received SUPI. The UDM 206 verifies if the UE 104 has the permissions to access the requested CAG cell/NPN 102*b* based on the allowed list of CAG cells retrieved based on the SUPI of the UE 104, and the CAG ID of the requested CAG cell. On verifying that the UE 104 has permissions to the requested CAG cell, the UDM 206 inserts the accept message, and the allowed list of CAG cells for the UE 104 in the Nudm_XXX Response message. At step 1404, the UDM 206 sends the Nudm_XXX Response message to the AMF/SEAF 202 indicating the successful verification. At step 1405, the AMF/SEAF 202 may proceed further with the registration request of the UE 104 on receiving the accept message from the UDM 206.

On verifying that the UE 104 does not have the permissions to access the CAG cell/NPN 102b, the UDM 206 inserts the reject message in the Nudm_XXX Response message. At step 1404, the UDM 206 sends the Nudm_XXX Response message including the reject message to the AMF/SEAF 202 indicating that the CAG cell is not allowed for the UE 104. At step 1405, the AMF/SEAF 202 rejects the registration request of the UE 104 on receiving the reject message from the UDM 206. At step 1406, the AMF/SEAF 202 sends the reject message and the appropriate cause value to the UE 104.

Figure 15:
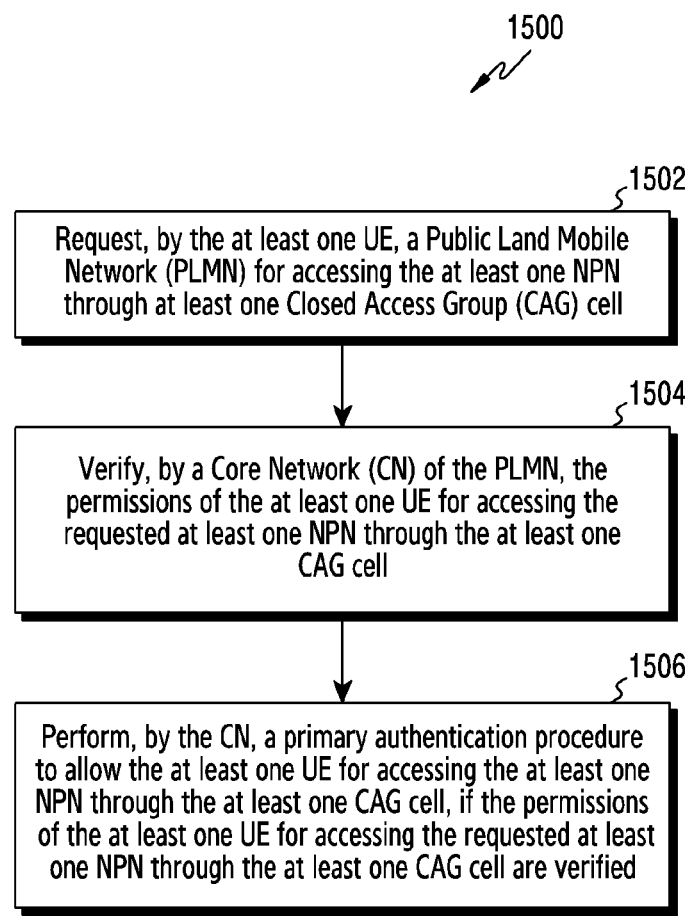
FIG. 15 is a flow diagram depicting a method for controlling the permissions of the at least one UE to access the at least one NPN in the wireless network, according to embodiments as disclosed herein.

FIG. 15 is a flow diagram depicting a method 1500 for controlling the permissions of the at least one UE 104 to access the at least one NPN 102b in wireless network 100, according to embodiments as disclosed herein. At step 1502, the method includes requesting, by the at least one UE 104, the PLMN 102a for accessing the at least one NPN 102b through the at least one CAG cell.

At step 1504, the method includes verifying, by the CN 108a of the PLMN 102a, the permissions of the at least one UE 104 for accessing the requested at least one NPN (102) through the at least one CAG cell.

At step 1506, the method includes performing, by the CN 108a, the primary authentication procedure to allow the at least one UE 104 for accessing the at least one NPN 102b through the at least one cell, if the permissions of the at least one UE 104 for accessing the requested at least one NPN 102 through the at least one CAG cell is verified. The various actions in method 1500 may be performed in the order presented, in a different order or simultaneously. Further, in some embodiments, some actions listed in FIG. 15 may be omitted.

According to various embodiments, a method for controlling permissions of at least one User Equipment (UE) (104) to access at least one Non-Public Network (NPN) (102b) in a network (100), the method comprises requesting, by the at least one UE (104), a Public Land Mobile Network (PLMN) (102a) for accessing the at least one NPN (102b) through at least one Closed Access Group (CAG) cell; verifying, by a Core Network (CN) (108a) of the PLMN (102b), the permissions of the at least one UE (104) for accessing the requested at least one NPN (102) through the at least one CAG cell; and performing, by the CN (108a), a primary authentication procedure to allow the at least one UE (104) for accessing the at least one NPN (102b) through the at least one CAG cell, if the permissions of the at least one UE (104) for accessing the requested at least one NPN (102) through the at least one CAG cell are verified.

In some embodiments, the at least one NPN (102b) is deployed in conjunction with the PLMN (102a) using the at least one CAG cell.

In some embodiments, the at least one NPN (102b) includes at least one of a non-standalone NPN (102b), and a stand-alone NPN (102b).

In some embodiments, at least one of a unified data management (UDM) (206), an access and mobility management function (AMF) (202), an authentication server function (AUSF) 204 of the CN (108a) verifies the permissions of the at least one UE (104) to access the requested at least one NPN (102) through the at least one CAG cell.

In some embodiments, a CAG server (110) coupled to the CN (108a) verifies the permissions of the at least one UE (104) to access the requested at least one NPN (102).

In some embodiments, requesting, by the at least one UE (102), the access to the at least one NPN (102a) includes: sending a request including a subscription concealed identifier (SUCI) of the at least one UE (102) to a Radio Access Network (RAN) (106a) of the PLMN (102b)).

In some embodiments, the method comprises: adding, by the RAN (106a), at least one CAG Identifier (CAG ID) of the at least one NPN (102b) that is requested by the at least one UE (104); and sending, by the RAN (106b), the received SUCI of the UE (104) and the at least one CAG ID of the requested at least one NPN to the CN (108a).

In some embodiments, requesting, by the at least one UE (102), the access to the at least one NPN (102a) includes: sending the request including the SUCI of the at least one UE (102) and the CAG ID of the requested at least one NPN to the RAN (106a) of the PLMN (102b).

In some embodiments, the CN (108a) verifies the permissions of the at least one UE (104) for accessing the at least one NPN (102b), only if the received request message includes the at least one CAG ID.

In some embodiments, verifying, by the CN (108a), the permissions of the at least one UE (104) includes: receiving the SUCI of the at least one UE (104), and the at least one CAG ID of the requested at least one NPN (102a) from the RAN (106a); deriving an allowed list of CAG cells for the at least one UE (104) based on the received SUCI of the at least one UE (104); and verifying the permissions of the at least one UE (104) to access the requested at least one NPN (102b) using the derived allowed list of CAG cells and the received at least one CAG ID of the requested at least one NPN (102b).

In some embodiments, deriving the allowed list of CAG cells for the at least one UE (104) includes: revealing the received SUCI of the at least one UE (104) to a subscription permanent identifier (SUPI); mapping the revealed SUPI of the at least one UE (104) with a map of the allowed list of CAG cells and the SUPIs of a plurality of UEs; and deriving the allowed list of CAG cells for the at least one UE (104) if the associated SUPI maps with the revealed SUPI of the at least one UE (104).

In some embodiments, verifying the permissions of the at least one UE (104) using the derived allowed list of CAG cells and the received CAG ID of the requested at least one NPN (102b) includes: determining if the received at least one CAG ID of the requested at least one NPN (102b) is present in the derived allowed list of CAG cells; verifying that the at least one UE (104) has the permissions for accessing the requested at least one NPN (102b) if the at least one received CAG ID of the requested at least one NPN (102b) is present in the derived allowed list of CAG cells; and verifying that the at least one UE (104) does not have the permissions for accessing the requested at least one NPN (102b) if the received at least one CAG ID of the requested at least one NPN (102b) is not present in the derived allowed list of CAG cells.

In some embodiments, the method comprises rejecting the request of the at least one UE (104) on verifying that the at least one UE (104) does not have the permissions for accessing the requested at least one NPN (102b); and sending a reject message to the at least one UE (104) with a cause value, wherein the cause value indicating at least one cause of an error for rejecting the request of the at least one UE (104).

In some embodiments, performing the primary authentication procedure includes: generating an authentication vector based on the revealed SUPI of the at least one UE (104) on verifying that the at least one UE (104) has the permissions for accessing the requested at least one NPN (102b); authenticating the at least one UE (104) based on the generated authentication vector on determining that if the at least one UE (104) has NPN permissions to access the requested at least one NPN (102*b*) through the PLMN (102*a*); and enabling the at least one UE (104) to access the at least one requested NPN (102*b*) if the at least one UE (104) has the NPN permissions to access the requested at least one NPN (102*b*) through the PLMN (102*a*).

According to various embodiments, a network (100) comprises at least one User Equipment (UE) (104); at least one Non-Public network (NPN) (102*a*); and a Public Land Mobile Network (PLMN) (102*a*). The at least one NPN (102*b*) is deployed in conjunction with the PLMN (102*a*), wherein the PLMN (102*a*) includes at least one cellular network (102*a*) comprising of a Radio Access Network (106*a*) and a Core Network (CN) (108*a*). The at least one UE (104) is configured to: request the PLMN (102*a*) for accessing the at least one NPN (102*a*) through at least one Closed Access Group (CAG) cell. The CN (108*a*) is configured to verify permissions of the at least one UE (104) for accessing the requested at least one NPN (102) via the at least one CAG cell; and perform a primary authentication procedure to allow the at least one UE (104) for accessing the at least one NPN (102*b*) through the at least one CAG cell, if the permissions of the at least one UE (104) for accessing the requested at least one NPN (102) through the at least one CAG cell are verified.

In some embodiments, the at least one NPN (102*b*) is deployed in conjunction with the PLMN (102*a*) using the at least one CAG cell.

In some embodiments, the at least one NPN (102*b*) includes at least one of a non-standalone NPN (102*b*), and a stand-alone NPN (102*b*).

In some embodiments, at least one of a unified data management (UDM), (206), an access and mobility management function (AMF) (202), an authentication server function (AUSF) 204 of the CN (108*a*) is further configured to verify the permissions of the at least one UE (104) to access the requested at least one NPN (102) through the at least one CAG cell.

In some embodiments, the PLMN (102*a*) further comprises a CAG server (110) coupled with the CN (108*a*) configured to verify the permissions of the at least one UE (104) to access the requested at least one NPN (102).

In some embodiments, the at least one UE (102) is further configured to send a request including a subscription concealed identifier (SUCI) of the at least one UE (102) to the RAN (106*a*) of the PLMN (102*b*) requesting access to the at least one NPN (102*b*).

In some embodiments, the at least one RAN (106*a*) is further configured to: add at least one CAG identifier (CAG ID) of the at least one NPN (102*b*) that is requested by the at least one UE (104); and send the received SUCI of the UE (104) and the CAG ID of the requested at least one NPN to the CN (108*a*).

In some embodiments, the at least one UE (102) is further configured to send the request including the SUCI of the at least one UE (102) and the CAG ID of the requested at least one NPN to the RAN (106*a*) of the PLMN (102*b*).

In some embodiments, the CN (108*a*) is further configured to verify the permissions of the at least one UE (104) for accessing the at least one NPN (102*b*), only if the received request messages includes the at least one CAG ID.

In some embodiments, the CN (108*a*) is further configured to: receive the SUCI of the at least one UE (104), and the at least one CAG ID of the requested at least one NPN (102*a*) from the RAN (106*a*); derive an allowed list of CAG cells for the at least one UE (104) based on the received SUCI of the at least one UE (104); and verify the permissions of the at least one UE (104) to access the requested at least one NPN (102*b*) using the derived allowed list of CAG cells and the received at least one CAG ID of the requested at least one NPN (102*b*).

In some embodiments, the CN (108*a*) is further configured to: reveal the received SUCI of the at least one UE (104) to a subscription permanent identifier (SUPI); map the revealed SUPI of the at least one UE (104) with a map of the allowed list of CAG cells and the SUPIs of a plurality of UEs; and derive the allowed list of CAG cells for the at least one UE (104) if the associated SUPI maps with the revealed SUPI of the at least one UE (104).

In some embodiments, the CN (108*a*) is further configured to: determine if the received at least one CAG ID of the requested at least one NPN (102*b*) is present in the derived allowed list of CAG cells; verify that the at least one UE (104) has the permissions for accessing the requested at least one NPN (102*b*) if the received at least one CAG ID of the requested at least one NPN (102*b*) is present in the derived allowed list of CAG cells; and verify that the at least one UE (104) does not have the permissions for accessing the requested at least one CAG cell of the at least one NPN (102*b*) if the received CAG ID of the requested at least one NPN (102*b*) is not present in the derived allowed list of CAG cells.

In some embodiments, the CN (108*a*) is further configured to: reject the request of the at least one UE (104) on verifying that the at least one UE (104) does not have the permissions for accessing the requested at least one CAG ID of the at least one NPN (102*b*); and send a reject message to the at least one UE (104) with a cause value, wherein the cause value indicating at least one cause of an error for rejecting the request of the at least one UE (104).

In some embodiments, the CN (108*a*) is further configured to: generate an authentication vector based on the received SUPI of the at least one UE (104) on verifying that the at least one UE (104) has the permissions for accessing the requested at least one NPN (102*b*); authenticate the at least one UE (104) based on the generated authentication vector on determining that if the at least one UE (104) has NPN permissions to access the requested at least one NPN (102*b*) through the PLMN (102*a*); and enable the at least one UE (104) to access the at least one requested NPN (102*b*) if the at least one UE (104) has the NPN permissions to access the requested at least one NPN (102*b*) through the PLMN (102*a*).

According to various embodiments, a network (100) comprises at least one User Equipment (UE) (104); at least one Non-Public Network (NPN) (102*a*); and a Public Land Mobile Network (PLMN) (102*a*), wherein the at least one NPN (102*b*) is deployed in conjunction with the PLMN (102*a*) through at least one Closed Access Group (CAG) cell, wherein the PLMN (102*a*) includes at least one cellular network (102*a*) comprising of a Radio Access Network (106*a*) and a Core Network (CN) (108*a*). The at least one UE (104) is configured to request the PLMN (102*a*) for an access to the at least one NPN (102*a*). The CN (108*a*) comprises a unified data management (UDM) (206) configured to: verify permissions of the at least one UE (104) to access the requested at least one NPN (102); and initiate a primary authentication procedure, if the permissions of the at least one UE (104) to access the requested at least one NPN (102) are verified.

In some embodiments, the at least one UE (104) is further configured to: send a request including a subscription concealed identifier (SUCI) of the at least one UE (104) to the RAN (106*a*) of the PLMN (102*b*) requesting access to the at least one NPN (102b); wherein the RAN (106a) is configured to: add a CAG ID of the at least one NPN (102b) that is requested by the at least one UE (104); and send the received SUCI of the UE (104) and the CAG ID of the requested at least one NPN (102a) to the CN (108a).

In some embodiments, the at least one UE (104) is further configured to send the request including the SUCI of the at least one UE (102) and the CAG ID of the requested at least one NPN to the RAN (106a) of the PLMN (102b).

In some embodiments, the CN (108a) further comprises: an access and mobility management function (AMF) (202) and an authentication server function (AUSF) 204; wherein the AMF (202) is configured to: receive the SUCI of the at least one UE (104) and the CAG ID of the requested at least one NPN (102a) from the RAN (106a); insert the received SUCI of the at least one UE (104) and the CAG ID of the requested at least one NPN (102a) in an authentication request message (Nusf_UEAuthentication_Authenticate Request message); and send the authentication request message to the AUSF (204). The AUSF (204) is further configured to derive the SUCI of the at least one UE (104) and the CAG ID of the requested at least one NPN (102a) from the received authentication request message; insert the derived SUCI of the at least one UE (104) and the CAG ID of the requested at least one NPN (102a) in an authentication get request message (Nudm_UEAuthentication_Get_Request message; and sending the authentication get request message to the UDM (206).

In some embodiments, the UDM (206) is further configured to: receive the SUCI of the at least one UE (104), and the CAG ID of the requested at least one NPN (102a) from the AUSF (204); reveal the received SUCI of the at least one UE (104) to a subscription permanent identifier (SUPI); map the revealed SUPI of the at least one UE (104) with a map of the allowed list of CAG cells and the SUPIs of a plurality of UEs; retrieve the allowed list of CAG cells for the at least one UE (104) if the associated SUPI maps with the revealed SUPI of the at least one UE (104); verify that the at least one UE (104) has the permissions to access the requested at least one NPN (102b) if the received CAG ID of the requested at least one NPN (102b) is present in the retrieved allowed list of CAG cells; and verify that the at least one UE (104) does not have the permissions to access the requested at least one NPN (102b) if the received CAG ID of the requested at least one NPN (102b) is not present in the retrieved allowed list of CAG cells.

In some embodiments, the UDM (206) is further configured to: insert a reject message and the SUPI of the at least one UE (204) in an authentication get request message (Nudm_UEAuthentication_Get Response message) on verifying that the at least one UE (104) does not have the access to the requested at least one NPN (102b); send the authentication get response message to the AUSF (204). The AUSF (204) is further configured to: derive the reject message from the received authentication get response message and insert the derived reject message in an authentication response message (Nausf_UEAuthentication_Authenticate Response message); send the authentication response message to the AMF (202). The AMF (202) is further configured to: reject the request of the at least one UE (104) on receiving the reject message from the AUSF (204); and send a reject message to the at least one UE (104) through the RAN (106a) with a cause value, wherein the cause value indicating at least one cause of an error for rejecting the request of the at least one UE (104).

In some embodiments, the UDM (206) is further configured to: generate an authentication vector based on the received SUCI of the at least one UE (104) on verifying the at least one UE (104) has the permissions to access the requested at least one NPN (102b); send the authentication vector to the AMF (202) through the AUSF (204); the AMF (202) is further configured to: authenticate the at least one UE (104) based on the received authentication vector to determine if the at least one UE (104) has NPN permissions to access the requested at least one NPN (102b) through the PLMN (102a); and enable the at least one UE (104) to access the at least one requested NPN (102b) if the at least one UE (104) has the NPN permissions to access the requested at least one NPN (102b) through the PLMN (102a).

According to various embodiments, a core network CN (108a) of a Public Land Mobile Network (PLMN) (102a), wherein the PLMN (102a) is in conjunction with at least one non-public network (NPN) (102a) and connected to at least one User Equipment (UE) (104), wherein the CN (108a) is configured to: receive a request from the at least one UE (104) through a Radio Access Network (RAN) (106a) for access to the at least one NPN (102a); verify permissions of the at least one UE (104) to access the requested at least one NPN (102); and perform a primary authentication procedure, if the permissions of the at least one UE (104) to access the requested at least one NPN (102) are verified.

In some embodiments, the request of the at least one UE (104 includes a subscription concealed identifier (SUCI) of the at least one UE (102) and a Closed Access Group (CAG ID) of the at least one NPN (102b) that is requested by the at least one UE (104).

In some embodiments, the CN (108a) is further configured to: reveal the received SUCI of the at least one UE (104) to a subscription permanent identifier (SUPI); map the revealed SUPI of the at least one UE (104) with a map of the allowed list of CAG cells and the SUPIs of a plurality of UEs; retrieve the allowed list of CAG cells for the at least one UE (104) if the associated SUPI maps with the revealed SUPI of the at least one UE (104); verify that the at least one UE (104) has the permissions to access the requested at least one NPN (102b) if the received CAG ID of the requested at least one NPN (102b) is present in the retrieved allowed list of CAG cells; and verify that the at least one UE (104) does not have the permissions to access the requested at least one NPN (102b) if the received CAG ID of the requested at least one NPN (102b) is not present in the retrieved allowed list of CAG cells.

In some embodiments, the CN (108a) is further configured to: reject the request of the at least one UE (104) on verifying that the at least one UE (104) does not have the permissions to access the requested at least one NPN (102b); and send a reject message to the at least one UE (104) through the RAN (106a) with a cause value, wherein the cause value indicating at least one cause of an error for rejecting the request of the at least one UE (104).

The embodiments disclosed herein can be implemented through at least one software program running on at least one hardware device and performing network management functions to control the elements. The elements shown in FIGS. 1A-14 can be at least one of a hardware device, or a combination of hardware device and software module.

The embodiments disclosed herein describe methods and systems for mitigating Denial of Service (DoS) attack in a wireless network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in an embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the present disclosure may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a unified data management (UDM) entity, the method comprising:
   receiving, from an authentication server function (AUSF), a request message including:
     a subscription concealed identifier (SUCI) of a user equipment (UE), and
     a closed access group (CAG) identifier of a CAG cell;
   identifying a subscription permanent identifier (SUPI) of the UE based on a deconcealing of the SUCI of the UE;
   verifying if the UE is allowed to access the CAG Cell or not by the UDM based on the SUPI of the UE;
   in case that the UE is not allowed to access the CAG Cell, transmitting, to the AUSF, a reject message including information for indicating a rejection of the CAG Cell; and
   in case that the UE is allowed to access the CAG Cell, performing, by the UDM, an authentication procedure between the UE and a network,
   wherein the authentication procedure comprises a generation of an authentication vector.

2. The method of claim 1,
   wherein the UDM is associated with a subscription identifier deconcealing function (SIDF), and
   wherein the request message further includes a serving network (SN) name.

3. The method of claim 1, further comprising:
   in case that the UE is allowed to access the CAG Cell, selecting an authentication method for the authentication procedure in the UDM.

4. A method performed by an authentication server function (AUSF), the method comprising:
   receiving, from a security anchor function (SEAF), a first request message including:
     a subscription concealed identifier (SUCI) of a user equipment (UE),
     a closed access group (CAG) identifier of a CAG cell;
   transmitting, to a unified data management (UDM), a second request message including:
     the SUCI of the UE, and
     the CAG identifier of the CAG cell;
   in case that the UE is not allowed to access the CAG Cell, receiving, from the UDM, a reject message including information for indicating a rejection of the CAG Cell; and
   in case that the UE is allowed to access the CAG Cell, receiving, from the UDM, a response message according to an authentication procedure between the UE and a network, the authentication procedure using an authentication vector,
   wherein the SUCI is used to obtain a subscription permanent identifier (SUPI) of the UE for verifying if the UE is allowed to access the CAG cell or not in the UDM.

5. The method of claim 4,
   wherein the first request message further includes a serving network (SN) name, and
   wherein the second request message further includes the SN name.

6. The method of claim 4, wherein the authentication procedure is associated with a selection of an authentication method in the UDM.

7. A method performed by a security anchor function (SEAF), the method comprising:
   receiving, from a user equipment (UE) via a base station, a registration request including:
     a closed access group (CAG) identifier of a CAG cell, and
     a subscription concealed identifier (SUCI) of the UE;
   transmitting, to a unified data management (UDM) via an authentication server function (AUSF), a request message including:
     the SUCI of the UE, and
     the CAG identifier of the CAG cell,
   in case that the UE is not allowed to access the CAG Cell, receiving, from the UDM via the AUSF, a reject message for indicating a rejection of the CAG Cell; and
   in case that the UE is allowed to access the CAG Cell, performing an authentication procedure between a network and the UE, the authentication procedure using an authentication vector,
   wherein the SUCI is used to obtain a subscription permanent identifier (SUPI) of the UE for verifying if the UE is allowed to access the CAG cell or not in the UDM.

8. The method of claim 7,
   wherein the request message further includes a serving network (SN) name, and
   wherein the SEAF is associated with an access and mobility management function (AMF).

9. The method of claim 7, wherein the authentication procedure is associated with a selection of an authentication method in the UDM.

10. An apparatus of a unified data management (UDM), comprising:
- at least one transceiver; and
- at least one processor operably coupled to the at least one transceiver, configured to:
  - receive, from an authentication server function (AUSF), a request message including:
    - a subscription concealed identifier (SUCI) of a user equipment (UE), and
    - a closed access group (CAG) identifier of a CAG cell;
  - identify a subscription permanent identifier (SUPI) of the UE based on a deconcealing of the SUCI of the UE;
  - verify if the UE is allowed to access the CAG Cell or not by the UDM based on the SUPI of the UE;
  - in case that the UE is not allowed to access the CAG Cell, transmit, to the AUSF, a reject message including information for indicating a rejection of the CAG Cell; and
  - in case that the UE is allowed to access the CAG Cell, perform, by the UDM, an authentication procedure between the UE and a network,
  - wherein the authentication procedure comprises a generation of an authentication vector.

11. The apparatus of claim 10,
- wherein the UDM is associated with a subscription identifier deconcealing function (SIDF), and
- wherein the request message further includes a serving network (SN) name.

12. The apparatus of claim 10, wherein the at least one processor is further configured to:
- in case that the UE is allowed to access the CAG Cell, select an authentication method for the authentication procedure in the UDM.

13. An apparatus of an authentication server function (AUSF), comprising:
- at least one transceiver; and
- at least one processor operably coupled to the at least one transceiver, configured to:
  - receive, from a security anchor function (SEAF), a first request message including:
    - a subscription concealed identifier (SUCI) of a user equipment (UE), and
    - a closed access group (CAG) identifier of a CAG cell;
  - transmit, to a unified data management (UDM), a second request message including:
    - the SUCI of the UE, and
    - the CAG identifier of the CAG cell,
  - in case that the UE is not allowed to access the CAG Cell, receive, from the UDM, a reject message including information for indicating a rejection of the CAG Cell; and
  - in case that the UE is allowed to access the CAG Cell, receive, from the UDM, a response message according to an authentication procedure between the UE and a network, the authentication procedure using an authentication vector,
  - wherein the SUCI is used to obtain a subscription permanent identifier (SUPI) of the UE for verifying if the UE is allowed to access the CAG cell or not in the UDM.

14. The apparatus of claim 13,
- wherein the first request message further includes a serving network (SN) name, and
- wherein the second request message further includes the SN name.

15. The apparatus of claim 13, wherein the authentication procedure is associated with a selection of an authentication method in the UDM.

16. An apparatus of a security anchor function (SEAF), comprising:
- at least one transceiver; and
- at least one processor operably coupled to the at least one transceiver, configured to:
  - receive, from a user equipment (UE) via a base station, a registration request including:
    - a closed access group (CAG) identifier of a CAG cell, and
    - a subscription concealed identifier (SUCI) of the UE;
  - transmit, to a unified data management (UDM) via an authentication server function (AUSF), a request message including:
    - the SUCI of the UE, and
    - the CAG identifier of the CAG cell,
  - in case that the UE is not allowed to access the CAG Cell, receive, from the UDM via the AUSF, a reject message for indicating a rejection of the CAG Cell; and
  - in case that the UE is allowed to access the CAG Cell, perform an authentication procedure between a network and the UE, the authentication procedure using an authentication vector,
  - wherein the SUCI is used to obtain a subscription permanent identifier (SUPI) of the UE for verifying if the UE is allowed to access the CAG cell or not in the UDM.

17. The apparatus of claim 16,
- wherein the request message further includes a serving network (SN) name, and
- wherein the SEAF is associated with an access and mobility management function (AMF).

18. The apparatus of claim 16, wherein the authentication procedure is associated with a selection of an authentication method in the UDM.

* * * * *